US012143845B2

(12) United States Patent
Kim

(10) Patent No.: US 12,143,845 B2
(45) Date of Patent: Nov. 12, 2024

(54) METHOD AND APPARATUS FOR DOWNLINK COMMUNICATION IN COMMUNICATION SYSTEM

(71) Applicant: ELECTRONICS AND TELECOMMUNICATIONS RESEARCH INSTITUTE, Daejeon (KR)

(72) Inventor: Jae Heung Kim, Sejong-si (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 18/189,198

(22) Filed: Mar. 23, 2023

(65) Prior Publication Data

US 2023/0269613 A1    Aug. 24, 2023

Related U.S. Application Data

(63) Continuation of application No. 17/219,578, filed on Mar. 31, 2021, now abandoned.

(30) Foreign Application Priority Data

| Apr. 10, 2020 | (KR) | 10-2020-0044096 |
| Jul. 8, 2020 | (KR) | 10-2020-0084157 |
| Jul. 22, 2020 | (KR) | 10-2020-0091044 |
| Mar. 25, 2021 | (KR) | 10-2021-0038455 |

(51) Int. Cl.
H04W 72/00 (2023.01)
H04L 1/00 (2006.01)
(Continued)

(52) U.S. Cl.
CPC ........... *H04W 24/08* (2013.01); *H04L 1/0061* (2013.01); *H04W 68/005* (2013.01); *H04W 72/0446* (2013.01); *H04W 72/0453* (2013.01); *H04W 72/23* (2023.01); *H04W 72/53* (2023.01); *H04W 76/11* (2018.02)

(58) Field of Classification Search
None
See application file for complete search history.

(56) References Cited

U.S. PATENT DOCUMENTS

2013/0336301 A1    12/2013    Deng et al.
2016/0044652 A1    2/2016    Xue et al.
(Continued)

FOREIGN PATENT DOCUMENTS

WO    2018031327 A1    2/2018
WO    2019190205 A1    10/2019

OTHER PUBLICATIONS

Intel Corporation, "RAN2 impacts when introducing RAN1 go-to-sleep mechanism", R2-1904442, 3GPP TSG RAN WG2 Meeting #105bis, Xi'an, China, Apr. 8-12, 2019.

*Primary Examiner* — Abdelillah Elmejjarmi
(74) *Attorney, Agent, or Firm* — Rabin & Berdo, P.C.

(57) ABSTRACT

An operation method of a terminal in a communication system may comprise receiving from a base station, first information indication suspension of a physical downlink control channel (PDCCH) monitoring operation; in response to the first information, suspending the PDCCH monitoring operation in a first period; and restarting the PDCCH monitoring operation after the first period ends.

17 Claims, 8 Drawing Sheets

(51) Int. Cl.
| | |
|---|---|
| *H04W 24/08* | (2009.01) |
| *H04W 68/00* | (2009.01) |
| *H04W 72/0446* | (2023.01) |
| *H04W 72/0453* | (2023.01) |
| *H04W 72/23* | (2023.01) |
| *H04W 72/53* | (2023.01) |
| *H04W 76/11* | (2018.01) |

(56) References Cited

U.S. PATENT DOCUMENTS

| | | |
|---|---|---|
| 2017/0325164 A1 | 11/2017 | Lee et al. |
| 2018/0317198 A1 | 11/2018 | Lee et al. |
| 2019/0098520 A1 | 3/2019 | Kim |
| 2019/0116592 A1 | 4/2019 | Moon et al. |
| 2020/0037389 A1 | 1/2020 | Feuersaenger et al. |
| 2020/0154295 A1 | 5/2020 | Lin |
| 2022/0007408 A1 | 1/2022 | Xu |
| 2022/0095270 A1* | 3/2022 | Shih ................ H04W 68/02 |
| 2022/0394664 A1* | 12/2022 | Xie .................... H04W 8/22 |

\* cited by examiner

METHOD AND APPARATUS FOR DOWNLINK COMMUNICATION IN COMMUNICATION SYSTEM

CROSS-REFERENCE TO RELATED APPLICATIONS

This application is a continuation of U.S. application Ser. No. 17/219,578, filed on Mar. 31, 2021, and claims priority to Korean Patent Applications No. 10-2020-0044096 filed on Apr. 10, 2020, No. 10-2020-0084157 filed on Jul. 8, 2020, No. 10-2020-0091044 filed on Jul. 22, 2020, and No. 10-2021-0038455 filed on Mar. 25, 2021 with the Korean Intellectual Property Office (KIPO), the entire contents of which are hereby incorporated by reference.

BACKGROUND

1. Technical Field

The present disclosure relates to a downlink communication technique, and more specifically, to a technique of monitoring a downlink control channel for reducing power consumption of a terminal.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

Meanwhile, a millimeter frequency band (e.g., a frequency band of 6 to 90 GHz) may be used to process rapidly increasing data. A small base station may be used to overcome deterioration of received signal performance due to path attenuation and reflection of radio waves in a high frequency band (e.g., millimeter frequency band). In a communication system supporting the millimeter frequency band, instead of a small base station supporting all functions of a radio protocol, a plurality of remote radio transmission/reception blocks (e.g., remote radio heads (RRHs)) and a centralized baseband processing function block may be deployed.

That is, all functions of a radio protocol can be distributedly supported in the remote radio transmission/reception blocks and the baseband processing function block in a functional split scheme. When the functional split technique is used, the communication system may be configured by a plurality of transmission and reception points (TRPs). The plurality of TRPs may perform communications using a carrier aggregation scheme, a dual connectivity scheme, a duplication transmission scheme, or the like. In the communication system supporting the functional split scheme, the carrier aggregation scheme, the dual connectivity scheme, a bi-casting scheme, the duplication transmission scheme, or the like, methods for reducing power consumption of a terminal by controlling a monitoring operation on a downlink control channel are required.

SUMMARY

Accordingly, exemplary embodiments of the present disclosure are directed to providing methods and apparatuses for monitoring a downlink control channel in a communication system.

According to a first exemplary embodiment of the present disclosure, an operation method of a terminal in a communication system may comprise: receiving, from a base station, first information indication suspension of a physical downlink control channel (PDCCH) monitoring operation; in response to the first information, suspending the PDCCH monitoring operation in a first period; and restarting the PDCCH monitoring operation after the first period ends.

The operation method may further comprise receiving configuration information for controlling the PDCCH monitoring operation from the base station, wherein the first period is indicated by the configuration information.

The configuration information may include one or more of a start time of the first period, a duration of the first period, an end time of the first period, a restart time of the PDCCH monitoring operation, information of a signaling occasion in which the first information is transmitted and received, information of a control resource set (CORESET) in which the first information is transmitted and received, and information of a search space in which the first information is transmitted and received.

The duration of the first period may be a multiple of a periodicity of the signaling occasion.

The first information may be received through one or more of a radio resource control (RRC) message, a medium access control (MAC) message, and a physical (PHY) message.

The first information may be received using a radio network temporary identifier (RNTI) configured for transmission and reception of the first information.

The RNTI may be a terminal-specific RNTI allocated for the terminal or a common RNTI allocated for a group including the terminal, and a cyclic redundancy check (CRC) of downlink control information (DCI) including the first information may be scrambled by the RNTI.

According to a second exemplary embodiment of the present disclosure, an operation method of a terminal in a communication system may comprise: receiving, from a base station, first information indication execution of a physical downlink control channel (PDCCH) monitoring operation; in response to the first information, performing the PDCCH monitoring operation in a first period; and suspending the PDCCH monitoring operation after the first period ends.

The operation method may further comprise receiving configuration information for controlling the PDCCH monitoring operation from the base station, wherein the first period is indicated by the configuration information.

The configuration information may include one or more of a transmission time of the first information, an offset between the transmission time of the first information and the first period, a start time of the first period, a duration of the first period, an end time of the first period, information of a signaling occasion in which the first information is transmitted and received, information of a control resource set (CORESET) in which the first information is transmitted and received, and information of a search space in which the first information is transmitted and received.

The first information may be received through one or more of a radio resource control (RRC) message, a medium access control (MAC) message, and a physical (PHY) message.

The first information may be received using a radio network temporary identifier (RNTI) configured for transmission and reception of the first information.

The RNTI may be a terminal-specific RNTI allocated for the terminal or a common RNTI allocated for a group including the terminal, and a cyclic redundancy check (CRC) of downlink control information (DCI) including the first information may be scrambled by the RNTI.

The first information may be received before an offset from a start time of the first period or in the first period, and the PDCCH monitoring operation may be performed to receive a paging message.

The first information may indicate execution of the PDCCH monitoring operation for reception of a paging message, and the first information may be received according to a signaling occasion periodicity.

According to a third exemplary embodiment of the present disclosure, an operation method of a base station in a communication system may comprise: generating configuration information for controlling a physical downlink control channel (PDCCH) monitoring operation; transmitting a radio resource control (RRC) message including the configuration information to a terminal; and transmitting first information indicating of a control of the PDCCH monitoring operation to the terminal.

The first information may indicate suspension or execution of the PDCCH monitoring operation.

The first information may be transmitted using a radio network temporary identifier (RNTI) configured for transmission and reception of the first information, and the RNTI may be a terminal-specific RNTI allocated for the terminal or a common RNTI allocated for a group including the terminal.

The first information may be transmitted before an offset from a start time of an execution period of the PDCCH monitoring operation or in the execution period of the PDCCH monitoring operation, and the PDCCH monitoring operation may be performed by the terminal to receive a paging message.

The configuration information may include one or more of a start time of an execution period of the PDCCH monitoring operation, a duration of the execution period, an end time of the execution period, a restart time of the PDCCH monitoring operation, a transmission time of the first information, an offset between the first information and the execution period, information of a signaling occasion in which the first information is transmitted and received, information of a control resource set (CORESET) in which the first information is transmitted and received, and information of a search space in which the first information is transmitted and received.

According to the exemplary embodiments of the present disclosure, a downlink control channel monitoring operation may be controlled in consideration of the operation state of the terminal (e.g., terminal mounted on a mobile means). For example, the base station may transmit information indicating suspension of the downlink control channel monitoring operation to the terminal, and the terminal may suspend the downlink control channel monitoring operation according to the indication of the base station. In addition, the base station may transmit information indicating execution of the downlink control channel monitoring operation to the terminal, and the terminal may perform the downlink control channel monitoring operation according to the indication of the base station. In this case, the power consumption of the terminal can be reduced, and the performance of the terminal can be improved. Therefore, the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

Figure 1:
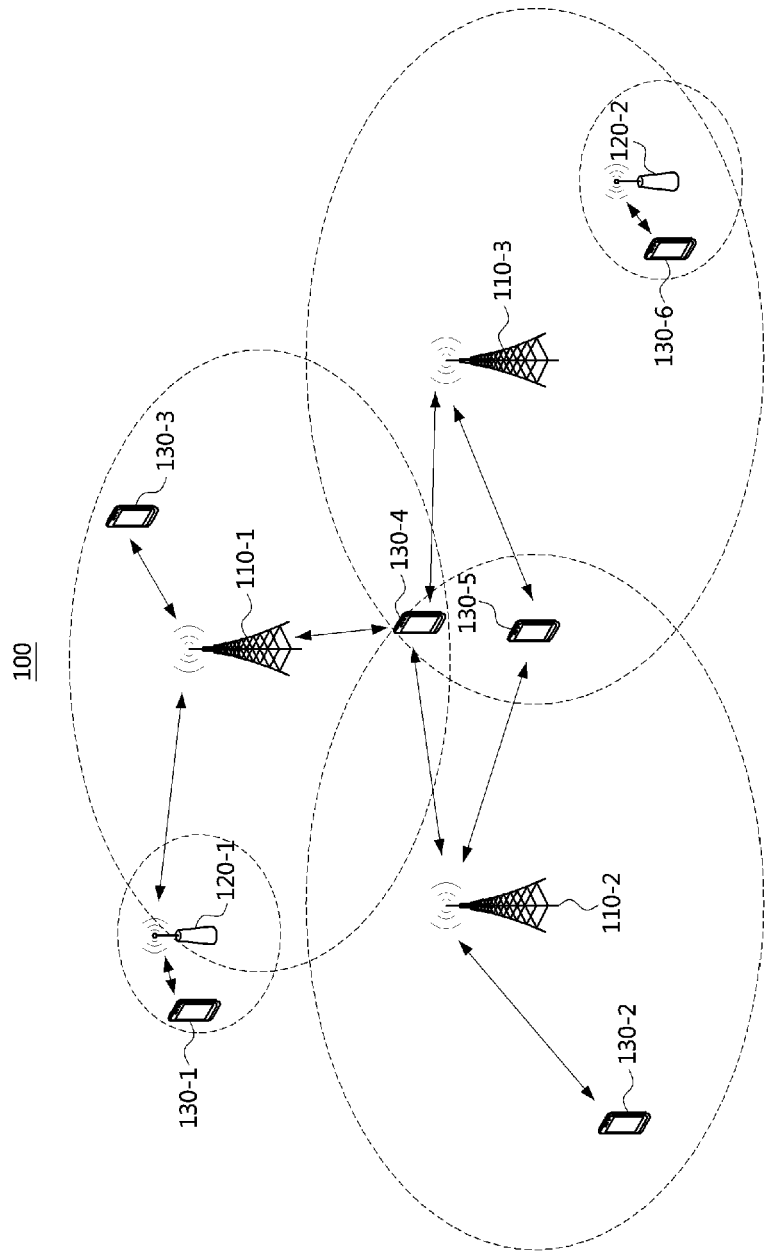
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication networks. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Also, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
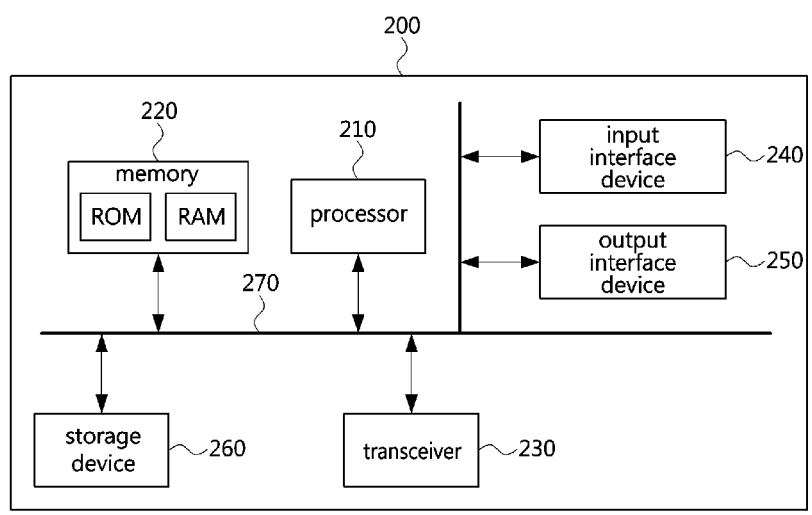
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In the following exemplary embodiments, a signaling message may be a signaling message including system information, an RRC signaling message, a MAC signaling message (e.g., MAC control element (CE)), and/or a PHY signaling message (e.g., downlink control information (DCI), uplink control information (UCI), sidelink control information (SCI)). The signaling message may be referred to as a 'control message'. In this case, the control message may be a control message including system information, an RRC control message, a MAC control message, and/or a PHY control message.

Meanwhile, in a communication system, a base station may perform all functions (e.g., remote radio transmission and reception function, baseband processing function, and the like) of a communication protocol. Alternatively, the remote radio transmission and reception function among all the functions of the communication protocol may be performed by a transmission reception point (TRP) (e.g., flexible TRP (f-TRP)), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of a backhaul link and a fronthaul link may be as follows. When a functional-split technique of the communication protocol is applied, the TRP may selectively perform some functions of the BBU or some functions of a medium access control (MAC) layer or a radio link control (RLC) layer.

Figure 3:
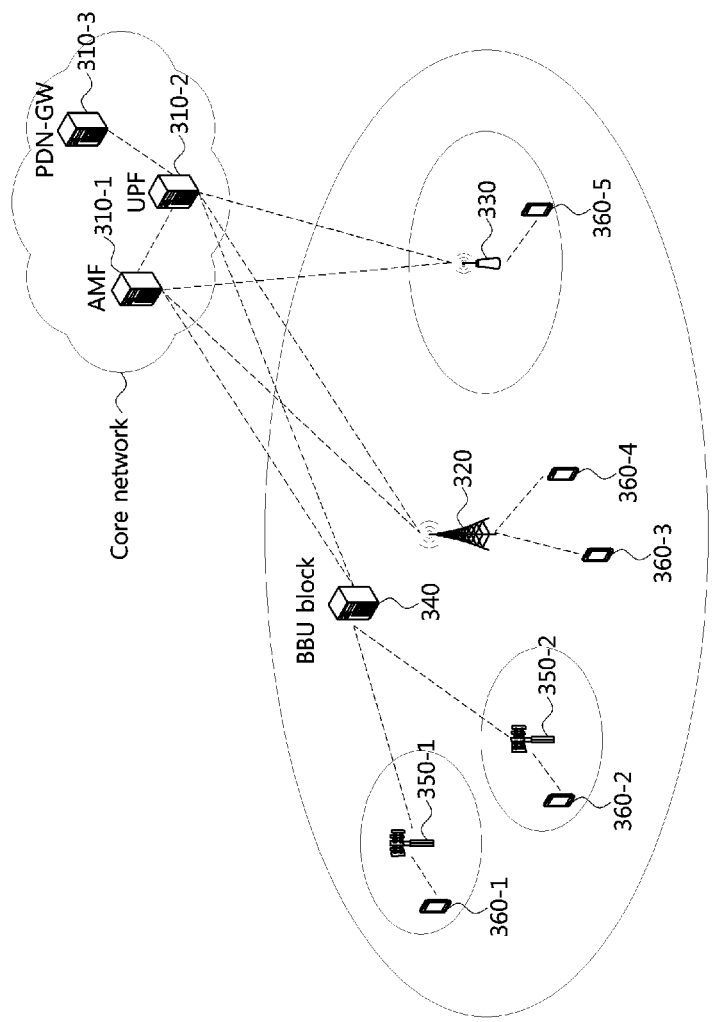
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a core network and an access network. The core network supporting the 4G communication may include an MME, an S-GW, a P-GW, and the like. The core network supporting the 5G communication may include an AMF 310-1, an UPF 310-2, a PDN-GW 310-3, and the like. The access network may include a macro base station 320, a small base station 330, TRPs 350-1 and 350-2, terminals 360-1, 360-2, 360-3, 360-4, and 360-5, and the like. The macro base station 320 or the small base station 330 may be connected to a termination node of the core network via a wired backhaul. The TRPs 350-1 and 350-2 may support the remote radio transmission and reception function among all the functions of the communication protocol, and the baseband processing function for the TRPs 350-1 and 350-2 may be performed by the BBU block 340. The BBU block 340 may belong to the access network or the core network. The communication nodes (e.g., MME, S-GW, P-GW, AMF, UPF, PDN-GW, macro base station, small base station, TRPs, terminals, and BBU block) belonging to the communication system may be configured identically or similarly to the communication node 200 shown in FIG. 2.

The macro base station 320 may be connected to the core network (e.g., AMF 310-1, UPF 310-2, MME, S-GW) using a wired backhaul link or a wireless backhaul link, and may provide communication services to the terminals 360-3 and 360-4 based on a communication protocol (e.g., 4G communication protocol, 5G communication protocol). The small base station 330 may be connected to the core network (e.g., AMF 310-1, UPF 310-2, MME, S-GW) using a wired backhaul link or a wireless backhaul link, and may provide communication services to the terminal 360-5 based on a communication protocol (e.g., 4G communication protocol, 5G communication protocol).

The BBU block 340 may be located in the AMF 310-1, the UPF 310-2, the MME, the S-GW, or the macro base station 320. Alternatively, the BBU block 340 may be located independently of each the AMF 310-1, the UPF 310-2, the MME, the S-GW, and the macro base station 320. For example, the BBU block 340 may be configured as a logical function block between the macro base station 320 and the AMF 310-1 (or UPF 310-2). The BBU block 340 may support the plurality of TRPs 350-1 and 350-2, and may be connected to each of the plurality of TRPs 350-1 and 350-2 using a wired fronthaul link or a wireless fronthaul link. That is, the link between the BBU block 340 and the TRPs 350-1 and 350-2 may be referred to as a 'fronthaul link'.

The first TRP 350-1 may be connected to the BBU block 340 via a wired fronthaul link or a wireless fronthaul link, and provide communication services to the first terminal 360-1 based on a communication protocol (e.g., 4G communication protocol, 5G communication protocol). The second TRP 350-2 may be connected to the BBU block 340 via a wired fronthaul link or a wireless fronthaul link, and provide communication services to the second terminal 360-2 based on a communication protocol (e.g., 4G communication protocol, 5G communication protocol).

The communication system including the access network, the Xhaul network, and the core network may be referred to as an 'integrated communication system'. The communication nodes (e.g., MME, S-GW, P-GW, AMF, UPF, BBU block, distributed unit (DU), central unit (CU), base station, TRP, terminal, and the like) belonging to the integrated communication system may be configured identically or similarly to the communication node 200 shown in FIG. 2. The communication nodes belonging to the Xhaul network may be connected using Xhaul links, and the Xhaul link may be a backhaul link or a fronthaul link.

Also, the UPF (or, S-GW) of the integrated communication system may refer to a termination communication node of the core network that exchanges packets (e.g., control information, data) with the base station, and the AMF (or, MME) of the integrated communication system may refer to a communication node in the core network, which performs control functions in a radio access section (or, interface) of the terminal. Here, each of the backhaul link, fronthaul link, Xhaul link, DU, CU, BBU block, S-GW, MME, AMF, and UPF may be referred to as a different term according to a function (e.g., function of the Xhaul network, function of the core network) of a communication protocol depending on a radio access technology (RAT).

In order to perform a mobility support function and a radio resource management function, the base station may transmit a synchronization signal (e.g., a synchronization signal/physical broadcast channel (SS/PBCH) block) and/or a reference signal. In order to support multiple numerologies, frame formats supporting symbols having different lengths may be configured. In this case, the terminal may perform a monitoring operation on the synchronization signal and/or reference signal in a frame according to an initial numerology, a default numerology, or a default symbol length. Each of the initial numerology and the default numerology may be applied to a frame format applied to radio resources in which a UE-common search space is configured, a frame format applied to radio resources in which a control resource set (CORESET) #0 of the NR communication system is configured, and/or a frame format applied to radio resources in which a synchronization symbol burst capable of identifying a cell in the NR communication system is transmitted.

The frame format may refer to information of configuration parameters (e.g., values of the configuration parameters, offset, index, identifier, range, periodicity, interval, duration, etc.) for a subcarrier spacing, control channel (e.g., CORESET), symbol, slot, and/or reference signal. The base station may inform the frame format to the terminal using system information and/or a control message (e.g., dedicated control message).

The terminal connected to the base station may transmit a reference signal (e.g., uplink dedicated reference signal) to the base station using resources configured by the corresponding base station. For example, the uplink dedicated reference signal may include a sounding reference signal (SRS). In addition, the terminal connected to the base station may receive a reference signal (e.g., downlink dedicated reference signal) from the base station in resources configured by the corresponding base station. The downlink dedicated reference signal may be a channel state information-reference signal (CSI-RS), a phase tracking-reference signal (PT-RS), a demodulation-reference signal (DM-RS), or the like. Each of the base station and the terminal may perform a beam management operation through monitoring on a configured beam or an active beam based on the reference signal.

For example, the base station 320 may transmit a synchronization signal and/or a reference signal so that the first terminal 360-3 located within its service area can search for itself to perform downlink synchronization maintenance, beam configuration, or link monitoring operations. The first terminal 360-3 connected to the base station 320 (e.g., serving base station) may receive physical layer radio resource configuration information for connection configuration and radio resource management from the base station 320. The physical layer radio resource configuration information may mean configuration parameters included in RRC control messages of the LTE communication system or the NR communication system. For example, the resource configuration information may include PhysicalConfigDedicated, PhysicalCellGroupConfig, PDCCH-Config(Common), PDSCH-Config(Common), PDCCH-ConfigSIB1, ConfigCommon, PUCCH-Config(Common), PUSCH-Config(Common), BWP-DownlinkCommon, BWP-UplinkCommon, ControlResourceSet, RACH-ConfigCommon, RACH-ConfigDedicated, RadioResourceConfigCommon, RadioResourceConfigDedicated, ServingCellConfig, ServingCellConfigCommon, and the like.

The radio resource configuration information may include parameter values such as a configuration (or allocation) periodicity of a signal (or radio resource) according to a frame format of the base station (or transmission frequency), time resource allocation information for transmission, frequency resource allocation information for transmission, a transmission (or allocation) time, or the like. In order to support multiple numerologies, the frame format of the base station (or transmission frequency) may mean a frame format having different symbol lengths according to a plurality of subcarrier spacings within one radio frame. For example, the number of symbols constituting each of a mini-slot, slot, and subframe that exist within one radio frame (e.g., a frame of 10 ms) may be configured differently.

- Configuration information of transmission a frequency and a frame format of a base station
  - Transmission frequency configuration information: information on all transmission carriers (i.e., cell-specific transmission frequency) in the base station, information on bandwidth parts (BWPs) in the base station, information on a transmission reference time or time difference between transmission frequencies of the base station (e.g., a transmission periodicity or offset parameter indicating the transmission reference time (or time difference) of the synchronization signal), etc.
  - Frame format configuration information: configuration parameters of a mini-slot, slot, and subframe having a different symbol length according to a subcarrier spacing
- Configuration information of a downlink reference signal (e.g., channel state information-reference signal (CSI-RS), common reference signal (Common-RS), etc.)
  - Configuration parameters such as a transmission periodicity, transmission position, code sequence, or masking (or scrambling) sequence for a reference signal, which are commonly applied within the coverage of the base station (or beam).
- Configuration information of an uplink control signal
  - Configuration parameters such as a sounding reference signal (SRS), uplink beam sweeping (or beam monitoring) reference signal, uplink grant-free radio resources (or, preambles), etc.
- Configuration information of a physical downlink control channel (e.g., PDCCH)
  - Configuration parameters such as a reference signal for PDCCH demodulation, beam common reference signal (e.g., reference signal that can be received by all terminals within a beam coverage), beam sweeping (or beam monitoring) reference signal, reference signal for channel estimation, etc.
- Configuration information of a physical uplink control channel (e.g., PUCCH)
- Scheduling request signal configuration information
- Configuration information for a feedback (acknowledgement (ACK) or negative ACK (NACK)) transmission resource in a hybrid automatic repeat request (HARQ) procedure
- Number of antenna ports, antenna array information, beam configuration or beam index mapping information for application of beamforming techniques
- Configuration information of a downlink signal and/or an uplink signal (or uplink access channel resource) for beam sweeping (or beam monitoring)
- Configuration information of parameters for beam configuration, beam recovery, beam reconfiguration, or radio link re-establishment operation, beam change operation within the same base station, reception signal of a beam triggering handover execution to another base station, timers controlling the above-described operations, etc.

In case of a radio frame format that supports a plurality of symbol lengths for supporting multi-numerology, the configuration (or allocation) periodicity of the parameter, the time resource allocation information, the frequency resource allocation information, the transmission time, and/or the allocation time, which constitute the above-described information, may be information configured for each corresponding symbol length (or subcarrier spacing).

In the following exemplary embodiments, 'Resource-Config information' may be a control message including one or more parameters of the physical layer radio resource configuration information. In addition, the 'Resource-Config information' may mean attributes and/or configuration values (or range) of information elements (or parameters) delivered by the control message. The information elements (or parameters) delivered by the control message may be radio resource configuration information applied commonly to the entire coverage of the base station (or, beam) or radio resource configuration information allocated dedicatedly to a specific terminal (or, specific terminal group). A terminal group may include one or more terminals.

The configuration information included in the 'Resource-Config information' may be transmitted through one control message or different control messages according to the attributes of the configuration information. The beam index information may not express the index of the transmission beam and the index of the reception beam explicitly. For example, the beam index information may be expressed using a reference signal mapped or associated with the corresponding beam index or an index (or identifier) of a transmission configuration indicator (TCI) state for beam management.

Therefore, the terminal operating in the RRC connected state may receive a communication service through a beam (e.g., beam pair) configured between the terminal and the base station. For example, when a communication service is provided using beam configuration (e.g., beam pairing) between the base station and the terminal, the terminal may perform a search operation or a monitoring operation of a radio channel by using a synchronization signal (e.g., SS/PBCH block) and/or a reference signal (e.g., CSI-RS) of a beam configured with the base station, or a beam that can be received. Here, the expression that a communication service is provided through a beam may mean that a packet is transmitted and received through an active beam among one or more configured beams. In the NR communication system, the expression that a beam is activated may mean that a configured TCI state is activated.

The terminal may operate in the RRC idle state or the RRC inactive state. In this case, the terminal may perform a search operation (e.g., monitoring operation) of a downlink channel by using parameter(s) obtained from system information or common Resource-Config information. In addition, the terminal operating in the RRC idle state or the RRC inactive state may attempt to access by using an uplink channel (e.g., a random access channel or a physical layer uplink control channel). Alternatively, the terminal may transmit control information by using an uplink channel.

The terminal may recognize or detect a radio link problem by performing a radio link monitoring (RLM) operation. Here, the expression that a radio link problem is detected may mean that physical layer synchronization configuration or maintenance for a radio link has a problem. For example, the expression that a radio link problem is detected may mean that it is detected that the physical layer synchronization between the base station and the terminal is not maintained during a preconfigured time. When a radio link problem is detected, the terminal may perform a recovery operation of the radio link. When the radio link is not recovered, the terminal may declare a radio link failure (RLF) and perform a re-establishment procedure of the radio link.

The procedure for detecting a physical layer problem of a radio link, procedure for recovering a radio link, procedure for detecting (or declaring) a radio link failure, and procedure for re-establishing a radio link according to the RLM operation may be performed by functions of a layer 1 (e.g., physical layer), a layer 2 (e.g., MAC layer, RLC layer, PDCP layer, etc.), and/or a layer 3 (e.g., RRC layer) of the radio protocol.

The physical layer of the terminal may monitor a radio link by receiving a downlink synchronization signal (e.g., primary synchronization signal (PSS), secondary synchronization signal (SSS), SS/PBCH block) and/or a reference signal. In this case, the reference signal may be a base station common reference signal, beam common reference signal, or terminal (or terminal group) specific reference signal (e.g., dedicated reference signal allocated to a terminal (or terminal group)). Here, the common reference signal may be used for channel estimation operations of all terminals located within the corresponding base station or beam coverage (or service area). The dedicated reference signal may be used for a channel estimation operation of a specific terminal or a specific terminal group located within the base station or beam coverage.

Accordingly, when the base station or the beam (e.g., configured beam between the base station and the terminal) is changed, the dedicated reference signal for beam management may be changed. The beam may be changed based on the configuration parameter(s) between the base station and the terminal. A procedure for changing the configured beam may be required. The expression that a beam is changed in the NR communication system may mean that an index (or identifier) of a TCI state is changed to an index of another TCI state, that a TCI state is newly configured, or that a TCI state is changed to an active state. The base station may transmit system information including configuration information of the common reference signal to the terminal.

The terminal may obtain the common reference signal based on the system information. In a handover procedure, synchronization reconfiguration procedure, or connection reconfiguration procedure, the base station may transmit a dedicated control message including the configuration information of the common reference signal to the terminal.

The configured beam information may include at least one of a configured beam index (or identifier), configured TCI state index (or identifier), configuration information of each beam (e.g., transmission power, beam width, vertical angle, horizontal angle), transmission and/or reception timing information of each beam (e.g., subframe index, slot index, mini-slot index, symbol index, offset), reference signal information corresponding to each beam, and reference signal identifier.

In the exemplary embodiments, the base station may be a base station installed in the air. For example, the base station may be installed on an unmanned aerial vehicle (e.g., drone), a manned aircraft, or a satellite.

The terminal may receive configuration information of the base station (e.g., identification information of the base station) from the base station through one or more of an RRC message, MAC message, and PHY message, and may identify a base station with which the terminal performs a beam monitoring operation, radio access operation, and/or control (or data) packet transmission and reception operation.

The result of the measurement operation (e.g., beam monitoring operation) for the beam may be reported through a physical layer control channel (e.g., PUCCH) and/or a MAC message (e.g., MAC CE, control PDU). Here, the result of the beam monitoring operation may be a measurement result for one or more beams (or beam groups). For example, the result of the beam monitoring operation may be a measurement result for beams (or beam groups) according to a beam sweeping operation of the base station.

The base station may obtain the result of the beam measurement operation or the beam monitoring operation from the terminal, and may change the properties of the beam or the properties of the TCI state based on the result of the beam measurement operation or the beam monitoring operation. The beam may be classified into a primary beam, a secondary beam, a reserved (or candidate) beam, an active beam, and a deactivated beam according to its properties. The TCI state may be classified into a primary TCI state, a secondary TCI state, a reserved (or candidate) TCI state, a serving TCI state, a configured TCI state, an active TCI state, and a deactivated TCI state according to its properties. Each of the primary TCI state and the secondary TCI state may be assumed to be an active TCI state and a serving TCI state. The reserved (or candidate) TCI state may be assumed to be a deactivated TCI state or a configured TCI state.

A procedure for changing the beam (or TCI state) property may be controlled by the RRC layer and/or the MAC layer. When the procedure for changing the beam (or TCI state) property is controlled by the MAC layer, the MAC layer may inform the higher layer of information regarding a change in the beam (or TCI state) property. The information regarding the change in the beam (or TCI state) property may be transmitted to the terminal through a MAC message and/or a physical layer control channel (e.g., PDCCH). The information regarding the change in the beam (or TCI state) property may be included in downlink control information (DCI) or uplink control information (UCI). The information regarding the change in the beam (or TCI state) property may be expressed as a separate indicator or field.

The terminal may request to change the property of the TCI state based on the result of the beam measurement operation or the beam monitoring operation. The terminal may transmit control information (or feedback information) requesting to change the property of the TCI state to the base station by using one or more of a PHY message, a MAC message, and an RRC message. The control information (or feedback information, control message, control channel) requesting to change the property of the TCI state may be configured using one or more of the configured beam information described above.

The change in the property of the beam (or TCI state) may mean a change from the active beam to the deactivated beam, a change from the deactivated beam to the active beam, a change from the primary beam to the secondary beam, a change from the secondary beam to the primary beam, a change from the primary beam to the reserved (or candidate) beam, or a change from the reserved (or candidate) beam to the primary beam. The procedure for changing the property of the beam (or TCI state) may be controlled by the RRC layer and/or the MAC layer. The procedure for changing the property of the beam (or TCI state) may be performed through partial cooperation between the RRC layer and the MAC layer.

When a plurality of beams are allocated, one or more beams among the plurality of beams may be configured as beam(s) for transmitting physical layer control channels. For example, the primary beam and/or the secondary beam may be used for transmission and reception of a physical layer control channel (e.g., PHY message). Here, the physical layer control channel may be a PDCCH or a PUCCH. The physical layer control channel may be used for transmission of one or more among scheduling information (e.g., radio resource allocation information, modulation and coding scheme (MCS) information), feedback information (e.g., channel quality indication (CQI), precoding matrix indicator (PMI), HARQ ACK, HARQ NACK), resource request information (e.g., scheduling request (SR)), result of the beam monitoring operation for supporting beamforming functions, TCI state ID, and measurement information for the active beam (or deactivated beam).

The physical layer control channel may be configured to be transmitted through the primary beam of downlink. In this case, the feedback information may be transmitted and received through the primary beam, and data scheduled by the control information may be transmitted and received through the secondary beam. The physical layer control channel may be configured to be transmitted through the primary beam of uplink. In this case, the resource request information (e.g., SR) and/or the feedback information may be transmitted and received through the primary beam.

In the procedure of allocating the plurality of beams (or the procedure of configuring the TCI states), the allocated (or configured) beam indexes, information indicating a spacing between the beams, and/or information indicating whether contiguous beams are allocated may be transmitted and received through a signaling procedure between the base station and the terminal. The signaling procedure of the beam allocation information may be performed differently according to status information (e.g., movement speed, movement direction, location information) of the terminal and/or the quality of the radio channel. The base station may obtain the status information of the terminal from the terminal. Alternatively, the base station may obtain the status information of the terminal through another method.

The radio resource information may include parameter(s) indicating frequency domain resources (e.g., center frequency, system bandwidth, PRB index, number of PRBs, CRB index, number of CRBs, subcarrier index, frequency offset, etc.) and parameter(s) indicating time domain resources (e.g., radio frame index, subframe index, transmission time interval (TTI), slot index, mini-slot index, symbol index, time offset, and periodicity, length, or window of transmission period (or reception period)). In addition, the radio resource information may further include a hopping pattern of radio resources, information for beamforming (e.g., beam shaping) operations (e.g., beam configuration information, beam index), and information on resources occupied according to characteristics of a code sequence (or bit sequence, signal sequence).

The name of the physical layer channel and/or the name of the transport channel may vary according to the type (or attribute) of data, the type (or attribute) of control information, a transmission direction (e.g., uplink, downlink, sidelink), and the like.

The reference signal for beam (or TCI state) or radio link management may be a synchronization signal (e.g., PSS, SSS, SS/PBCH block), CSI-RS, PT-RS, SRS, DM-RS, or the like. The reference parameter(s) for reception quality of the reference signal for beam (or TCI state) or radio link management may include a measurement time unit, a measurement time interval, a reference value indicating an improvement in reception quality, a reference value indicating a deterioration in reception quality, or the like. Each of the measurement time unit and the measurement time interval may be configured in units of an absolute time (e.g., millisecond, second), TTI, symbol, slot, frame, subframe, scheduling periodicity, operation periodicity of the base station, or operation periodicity of the terminal.

The reference value indicating the change in reception quality may be configured as an absolute value (dBm) or a relative value (dB). In addition, the reception quality of the reference signal for beam (or TCI state) or radio link management may be expressed as a reference signal received power (RSRP), a reference signal received quality (RSRQ), a received signal strength indicator (RSSI), a signal-to-noise ratio (SNR), a signal-to-interference ratio (SIR), or the like.

Meanwhile, in the NR communication system using a millimeter frequency band, flexibility for a channel bandwidth operation for packet transmission may be secured based on a bandwidth part (BWP) concept. The base station may configure up to 4 BWPs having different bandwidths to the terminal. The BWPs may be independently configured for downlink and uplink. That is, downlink BWPs may be distinguished from uplink BWPs. Each of the BWPs may have a different subcarrier spacing as well as a different bandwidth. For example, BWPs may be configured as follows.

Figure 4:
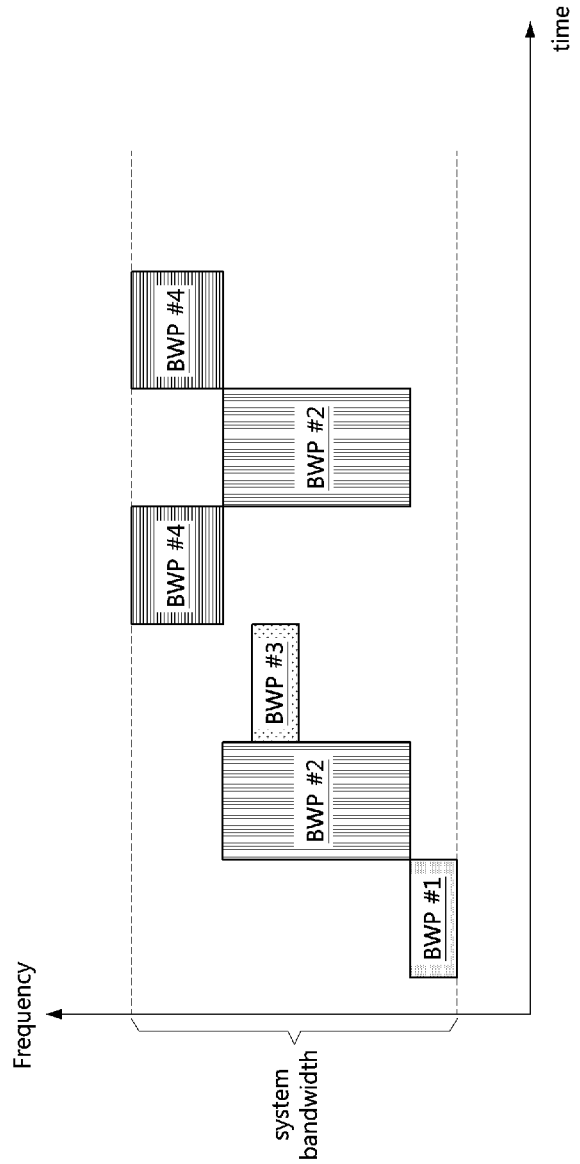
FIG. 4 is a conceptual diagram illustrating a first exemplary embodiment of a method for configuring bandwidth parts (BWPs) in a communication system.

FIG. 4 is a conceptual diagram illustrating a first exemplary embodiment of a method for configuring bandwidth parts (BWPs) in a communication system.

As shown in FIG. 4, a plurality of bandwidth parts (e.g., BWPs #1 to #4) may be configured within a system bandwidth of the base station. The BWPs #1 to #4 may be configured not to be larger than the system bandwidth of the base station. The bandwidths of the BWPs #1 to #4 may be different, and different subcarrier spacings may be applied to the BWPs #1 to #4. For example, the bandwidth of the BWP #1 may be 10 MHz, and the BWP #1 may have a 15 kHz subcarrier spacing. The bandwidth of the BWP #2 may be 40 MHz, and the BWP #2 may have a 15 kHz subcarrier spacing. The bandwidth of the BWP #3 may be 10 MHz, and the BWP #3 may have a 30 kHz subcarrier spacing. The bandwidth of the BWP #4 may be 20 MHz, and the BWP #4 may have a 60 kHz subcarrier spacing.

The BWPs may be classified into an initial BWP (e.g., first BWP), an active BWP (e.g., activated BWP), and a default BWP. The terminal may perform an initial access procedure (e.g., access procedure) with the base station in the initial BWP. One or more BWPs may be configured through an RRC connection configuration message, and one BWP among the one or more BWPs may be configured as the active BWP. Each of the terminal and the base station may transmit and receive packets in the active BWP among the configured BWPs. Therefore, the terminal may perform a monitoring operation on control channels for packet transmission and reception in the active BWP.

The terminal may switch the operating BWP from the initial BWP to the active BWP or the default BWP. Alternatively, the terminal may switch the operating BWP from the active BWP to the initial BWP or the default BWP. The BWP switching operation may be performed based on an indication of the base station or a timer. The base station may transmit information indicating the BWP switching to the terminal using one or more of an RRC message, a MAC message (e.g., MAC control element (CE)), and a PHY message (e.g., DCI). The terminal may receive the information indicating the BWP switching from the base station, and may switch the operating BWP of the terminal to a BWP indicated by the received information.

When a random access (RA) resource is not configured in the active uplink (UL) BWP in the NR communication system, the terminal may switch the operating BWP of the terminal from the active UL BWP to the initial UL BWP in order to perform a random access procedure. The operating BWP may be a BWP in which the terminal performs communication (e.g., transmission and reception operation of a signal and/or channel).

Measurement operations (e.g., monitoring operations) for beam (or TCI state) or radio link management may be performed at the base station and/or the terminal. The base station and/or the terminal may perform the measurement operations (e.g., monitoring operations) according to parameter(s) configured for the measurement operations (e.g., monitoring operations). The terminal may report a measurement result according to parameter(s) configured for measurement reporting.

When a reception quality of a reference signal according to the measurement result meets a preconfigured reference value and/or a preconfigured timer condition, the base station may determine whether to perform a beam (or, radio link) management operation, a beam switching operation, or a beam deactivation (or, activation) operation according to a beam blockage situation. When it is determined to perform a specific operation, the base station may transmit a message triggering execution of the specific operation to the terminal. For example, the base station may transmit a control message for instructing the terminal to execute the specific operation to the terminal. The control message may include configuration information of the specific operation.

When a reception quality of a reference signal according to the measurement result meets a preconfigured reference value and/or a preconfigured timer condition, the terminal may report the measurement result to the base station. Alternatively, the terminal may transmit to the base station a control message triggering a beam (or, radio link) management operation, a beam switching operation (or a TCI state ID change operation, a property change operation), or a beam deactivation operation (or a beam activation operation) according to a beam blockage situation. The control message may request to perform a specific operation.

A basic procedure for beam (or TCI state) management through the radio link monitoring may include a beam failure detection (BFD) procedure, a beam recovery (BR) request procedure, and the like for a radio link. An operation of determining whether to perform the beam failure detection procedure and/or the beam recovery request procedure, an operation triggering execution of the beam failure detection procedure and/or the beam recovery request procedure, and a control signaling operation for the beam failure detection procedure and/or the beam recovery request procedure may be performed by one or more of the PHY layer, the MAC layer, and the RRC layer.

Figure 5:
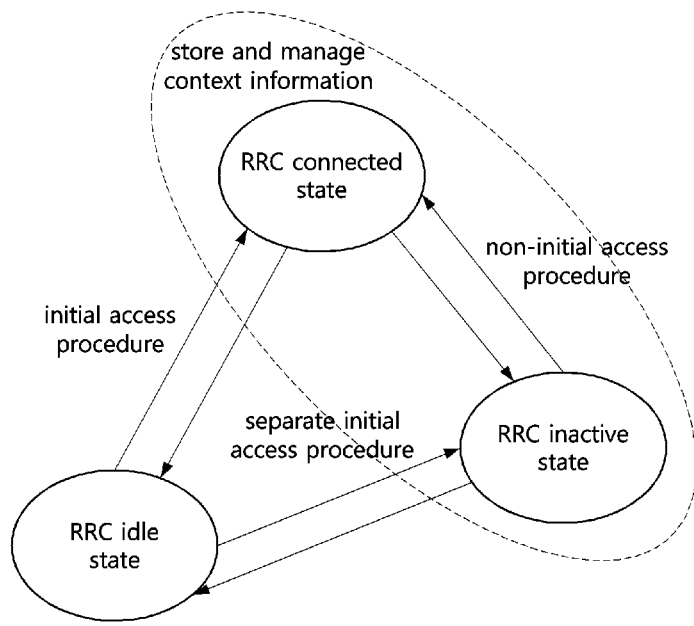
FIG. 5 is a conceptual diagram illustrating a first exemplary embodiment of operation states of a terminal in a communication system.

FIG. 5 is a conceptual diagram illustrating a first exemplary embodiment of operation states of a terminal in a communication system.

As shown in FIG. 5, operation states of the terminal may be classified into an RRC connected state, an RRC inactive state, and an RRC idle state. When the terminal operates in the RRC connected state or the RRC inactive state, a radio access network (RAN) (e.g., a control function block of the RAN) and the base station may store and manage RRC connection configuration information and/or context information (e.g., RRC context information, AS context information) of the corresponding terminal.

The terminal operating in the RRC connected state may receive configuration information of physical layer control channels and/or reference signals required for maintaining connection configuration and transmission/reception of data from the base station. The reference signal may be a reference signal for demodulating the data. Alternatively, the reference signal may be a reference signal for channel quality measurement or beamforming. Therefore, the terminal operating in the RRC connected state may transmit and receive the data without delay.

When the terminal operates in the RRC inactive state, mobility management functions/operations identical or similar to mobility management functions/operations supported in the RRC idle state may be supported for the corresponding terminal. That is, when the terminal operates in the RRC inactive state, a data bearer for transmitting and receiving data may not be configured, and functions of the MAC layer may be deactivated. Accordingly, the terminal operating in the RRC inactive state may transition the operation state of the terminal from the RRC inactive state to the RRC connected state by performing the non-initial access procedure to transmit data. Alternatively, the terminal operating in the RRC inactive state may transmit data having a limited size, data having a limited quality of service, and/or data associated with a limited service.

When the terminal operates in the RRC idle state, there may be no connection configuration between the terminal and the base station, and the RRC connection configuration information and/or context information (e.g., RRC context information, AS context information) of the terminal may not be stored in the RAN (e.g., a control function block of the RAN) and the base station. In order to transition the operation state of the terminal from the RRC idle state to the RRC connected state, the terminal may perform the initial access procedure. Alternatively, when the initial access procedure is performed, the operation state of the terminal may transition from the RRC idle state to the RRC inactive state according to determination of the base station.

The terminal may transition from the RRC idle state to the RRC inactive state by performing the initial access procedure or a separate access procedure defined for the RRC inactive state. When a limited service is provided to the terminal, the operation state of the terminal may transition from the RRC idle state to the RRC inactive state. Alternatively, depending on capability of the terminal, the operation state of the terminal may transition from the RRC idle state to the RRC inactive state.

The base station and/or the control function block of the RAN may configure condition(s) for transitioning to the RRC inactive sate by considering one or more of the type, capability, and service (e.g., a service currently being provided and a service to be provided) of the terminal, and may control the operation for transitioning to the RRC inactive state based on the configured condition(s). When the base station allows the transition to the RRC inactive state or when the transition to the RRC inactive state is configured to be allowed, the operation state of the terminal may be transitioned from the RRC connected state or the RRC idle state to the RRC inactive state.

A control function block of the base station and/or RAN may configure a condition(s) of transitioning to the RRC inactive state in consideration of one or more of the type, capability, and service (e.g., service currently being provided, service to be provided) of the terminal, and may control an operation of transition to the RRC inactive state based on the configured condition(s). When the base station allows the operation of transition to the RRC inactive state or when the terminal is configured to be able to transition to the RRC inactive state, the operation state of the terminal may be transitioned from the RRC connected state or the RRC idle state to the RRC inactive state.

The base station may transmit a DCI (hereinafter referred to as 'scheduling DCI') including scheduling information of a downlink resource (e.g., PDSCH) and/or an uplink resource (e.g., PUSCH) on a PDCCH. In addition, the DCI may further include slot format information, a transmit power control (TPC) command, and the like. A terminal (e.g., terminal operating in the RRC connected state) may perform a monitoring operation on a PDCCH in order to receive the scheduling DCI. The terminal may perform a PDCCH monitoring operation using a radio network temporary identifier (RNTI) allocated (or, configured) to the terminal. When a DCI masked by the RNTI (e.g., scheduling identifier) is detected, the terminal may identify information element(s) included in the DCI by performing a decoding operation on the corresponding DCI. That is, the terminal may obtain control information from the DCI. The terminal may receive downlink data from the base station based on information element(s) included in the DCI. Alternatively, the terminal may transmit uplink data to the base station based on the information element(s) included in the DCI.

Here, the RNTI (e.g., scheduling identifier) may be a cell (C)-RNTI, a temporary cell (TC)-RNTI, a configured scheduling (CS)-RNTI, a slot format indication (SFI)-RNTI, a semi-persistent channel state information (SP-CSI)-RNTI, a modulation and coding scheme (MCS)-C-RNTI, a transmit power control sounding reference signal (TPC-SRS)-RNTI, a TPC-PUSCH-RNTI, a TPC-PUCCH-RNTI, a system information (SI)-RNTI, a paging (P)-RNTI, a random access (RA)-RNTI, a MSGB-RNTI, an interruption (INT)-RNTI, a power saving (PS)-RNTI, a cancellation indication (CI)-RNTI, a sidelink (SL)-RNTI, an SL configured scheduling (SLCS)-RNTI, a predefined uplink resource (PUR)-RNTI, or the like.

If a DCI is not received by the PDCCH monitoring operation, the terminal may not perform a transmission/reception operation until a next PDCCH monitoring time. If a DCI (e.g., effective DCI) is not received, the terminal may continuously perform the PDCCH monitoring operation. In this case, power consumption of the terminal may increase due to the unnecessary PDCCH monitoring operations. In order to reduce the power consumption of the terminal, the PDCCH monitoring operation may be controlled.

A signaling for controlling the PDCCH monitoring operation (e.g., DL-SkipSig) may indicate suspension of the PDCCH monitoring operation to the terminal (or terminal group). In exemplary embodiments, 'suspension' may have a meaning including 'stop'. Alternatively, 'stop' may have a meaning including 'suspension'. The base station may transmit a DL-SkipSig to the terminal. When the DL-SkipSig is received from the base station, the terminal may not perform a PDCCH monitoring operation in a preconfigured period.

The base station may transmit, to the terminal, configuration information of signaling (e.g., DL-SkipSig) for controlling the PDCCH monitoring operation through one or a combination of two or more of a higher layer message (e.g., RRC message), a MAC message (e.g., MAC control element (CE)), and a PHY message (e.g., DCI). The configuration information of DL-SkipSig may include one or more parameters described in Table 1 below.

TABLE 1

| DL-SkipSig configuration information |
| --- |
| A time at which the PDCCH monitoring operation is suspended (e.g., a start time of a period (i.e., suspension period) in which the PDCCH monitoring operation is stopped (i.e., suspended)) |
| A suspension period in which the PDCCH monitoring operation is suspended (e.g., a duration of the period in which the PDCCH monitoring operation is stopped). The suspension period may be configured with a window and/or a timer. |
| A time at which the suspension of the PDCCH monitoring operation ends (e.g., an end time of the period (i.e., suspension period) in which the PDCCH monitoring operation is stopped (i.e., suspended)) |
| A restart time of the PDCCH monitoring operation |
| DL-SkipSig signaling occasion (or, occasion periodicity) |
| Offset(s) for parameter(s) for DL-SkipSig signaling |
| Information of a control resource set (CORESET) and/or a search space in which the DL-SkipSig signaling is transmitted |
| Information indicating a target (e.g., BWP, terminal, and/or terminal group) of the suspension and/or restart of the PDCCH monitoring operation |

The parameter(s) defined in Table 1 may be set in units of radio frames, subframes, slots, minislots, or symbols. The suspension period (e.g., time window, period corresponding to the timer, duration) of the PDCCH monitoring operation may be set as a multiple of a DL-SkipSig signaling occasion (or periodicity).

The DL-SkipSig configuration information may be configured for each terminal or each terminal group. When the DL-SkipSig configuration information is configured for each terminal group, a parameter indicating a specific terminal group may be included in the DL-SkipSig configuration information.

A radio resource in which the information (e.g., DL-SkipSig information) indicating suspension and/or restart of the PDCCH monitoring operation is transmitted may be predefined (or fixed). In this case, the DL-SkipSig configuration information may include configuration parameter(s) for the radio resource in which the DL-SkipSig information is transmitted in the time domain and/or the frequency domain. That is, the signaling for controlling the PDCCH monitoring operation (e.g., DL-SkipSig) may be transmitted in the resource (e.g., downlink radio resource) predefined in the time domain and/or the frequency domain. Accordingly, the terminal may detect the DL-SkipSig from the predefined resource (e.g., configured resource), and may suspend or restart the PDCCH monitoring according to the detected DL-SkipSig.

The signaling (e.g., DL-SkipSig) for controlling suspension and restart of the PDCCH monitoring operation may be transmitted and received using an RNTI (e.g., scheduling identifier). The DL-SkipSig may be transmitted using one or a combination of two or more of the RNTI, system information, an RRC message, a MAC message, and a PHY message.

When the DL-SkipSig is transmitted and received using the RNTI, a scheduling identifier (e.g., SkipSig-RNTI) for the DL-SkipSig may be configured. The SkipSig-RNTI may be uniquely allocated to a specific terminal to support the function of suspending the PDCCH monitoring operation. Alternatively, an RNTI uniquely allocated to a specific terminal may be configured as the SkipSig-RNTI. That is, a terminal-specific RNTI may be configured as the RNTI for transmission and reception of the DL-SkipSig. A DCI (e.g., PDCCH) itself having a cyclic redundancy check (CRC) scrambled by the SkipSig-RNTI may mean the DL-SkipSig. The SkipSig-RNTI may be configured as a scheduling identifier (e.g., common RNTI) commonly applied to one or more terminal groups within the base station. Accordingly, the base station may transmit control information for suspension and/or restart the PDCCH monitoring in units of a terminal or a terminal group by using the SkipSig-RNTI.

When the SkipSig-RNTI is received (e.g., detected), the terminal may temporarily suspend (i.e., stop) the PDCCH monitoring operation in a suspension period (e.g., window, period corresponding to the timer, duration) according to the DL-SkipSig configuration information. Alternatively, the terminal may temporarily suspend (i.e., stop) the PDCCH monitoring operation until an end time or a restart time of the suspension period according to the DL-SkipSig configuration information. When the suspension period of the PDCCH monitoring operation ends or when the restart time of the PDCCH monitoring operation arrives, the terminal may perform the PDCCH monitoring operation again. The terminal may receive a DCI by performing the PDCCH monitoring operation, and may perform an operation (e.g., downlink reception operation, uplink transmission operation) based on information element(s) included in the DCI.

When the DL-SkipSig, which controls suspension and restart of the PDCCH monitoring operation, is transmitted and received using an RNTI (e.g., scheduling identifier), a scheduling identifier indicating suspension of the PDCCH monitoring operation may be configured differently from a scheduling identifier indicating restart of the PDCCH monitoring operation. In this case, when a scheduling identifier of the DL-SkipSig received in the DL-SkipSig signaling occasion (or period) indicates suspension of the PDCCH monitoring operation, the terminal may suspend the PDCCH monitoring operation. When a scheduling identifier of the DL-SkipSig received in the DL-SkipSig signaling occasion (or period) indicates restart of the PDCCH monitoring operation, the terminal may perform the PDCCH monitoring operation again.

The signaling operation of the DL-SkipSig for controlling suspension and restart of the PDCCH monitoring operation may be performed based on a DCI. For example, a specific field in the DCI may indicate suspension and/or restart of the PDCCH monitoring operation.

When control information in the DCI indicates that the PDCCH monitoring operation is to be suspended, the terminal may suspend the PDCCH monitoring operation after the DCI is received. When the DCI includes information indicating a time point for the suspension of the PDCCH monitoring operation, the terminal may suspend the PDCCH monitoring operation at the time point indicated by the corresponding DCI.

The DL-SkipSig configuration information may be pre-configured using system information and/or a control message (e.g., RRC message, MAC message, PHY message). In this case, the terminal may suspend the PDCCH monitoring operation during a suspension period (e.g., period corresponding to the window and/or the timer) according to the DL-SkipSig configuration information. Alternatively, the terminal may suspend the PDCCH monitoring operation until an end time or a restart time according to the DL-SkipSig configuration information. When the suspension period of the PDCCH monitoring operation ends or when the restart time of the PDCCH monitoring operation arrives, the terminal may perform the PDCCH monitoring operation again. The terminal may receive a DCI by performing the PDCCH monitoring operation, and may perform an operation (e.g., downlink reception operation, uplink transmission operation) according information element(s) included in the DCI.

Alternatively, suspension and restart of the PDCCH monitoring operation may be indicated by a DCI. In this case, the DCI may include one or more parameters defined in Table 1. Each parameter included in the DCI may be set in units of radio frames, subframes, slots, minislots, or symbols. The suspension period (e.g., period corresponding to the window and/or the timer) of the PDCCH monitoring operation may be set as a multiple of the DL-SkipSig signaling occasion (or periodicity).

The terminal may receive the DCI from the base station, and may suspend and/or restart the PDCCH monitoring operation according to DL-SkipSig information included in the DCI. For example, the terminal may suspend the PDCCH monitoring operation at a suspension time according to the DL-SkipSig information included in the DCI. The terminal may perform the PDCCH monitoring operation again at a restart time according to the DL-SkipSig information included in the DCI. The terminal may receive a DCI by performing the PDCCH monitoring operation, and may perform an operation (e.g., downlink reception operation, uplink transmission operation) according to information element(s) included in the DCI.

When the DL-SkipSig signaling operation is performed based on a DCI, a specific bit in the DCI may be used to control the PDCCH monitoring operation. For example, a specific bit set to a first value (e.g., 1) may indicate suspension of the PDCCH monitoring operation. In addition, the specific bit set to the first value may indicate that data (e.g., packet) to be transmitted to the terminal (or terminal group) through a PDSCH does not exist in a scheduling period to which the specific bit is applied (e.g., resource scheduled by the corresponding DCI). Therefore, when the specific bit in the DCI is set to the first value, the terminal (or terminal group) may not perform a reception operation (e.g., demodulation operation, decoding operation) in a PDSCH radio resource (e.g., resource scheduled by the corresponding DCI) within the corresponding scheduling period. The specific bit set to a second value (e.g., 0) in the DCI may indicate execution of the PDCCH monitoring operation without suspension. Alternatively, the specific bit set to the second value in the DCI may indicate restart of the PDCCH monitoring operation.

When suspension and/or restart of the PDCCH monitoring operation is indicated using the control information (e.g., specific field, specific bit) in the DCI, the DCI may include information indicating a terminal group. In this case, all terminals belonging to the terminal group indicated by the DCI may suspend and/or restart the PDCCH monitoring operation according to the control information included in the DCI.

The base station may transmit the DCI for controlling suspension and/or restart of the PDCCH monitoring operation to the terminal by using the SkipSig-RNTI. In this case, the terminal (or terminal group) may control (e.g., suspend and/or restart) the PDCCH monitoring operation based on the SkipSig-RNTI and/or the DCI.

Alternatively, the signaling operation of the DL-SkipSig for controlling suspension and/or restart of the PDCCH monitoring operation may be performed based on a MAC control message (e.g., MAC subheader, MAC (sub)PDU, etc.). In this case, the base station may instruct the terminal to perform a suspension operation and/or a restart operation of the PDCCH monitoring operation by using the MAC control message. When the MAC control message indicates suspension of the PDCCH monitoring operation, the MAC layer of the terminal may transmit an internal signal (e.g., primitive or triggering signal) indicating suspension of the PDCCH monitoring operation to the PHY layer of the terminal.

When the internal signal indicating suspension of the PDCCH monitoring operation is received from the MAC layer, the PHY layer of the terminal may suspend the PDCCH monitoring operation in a suspension period (e.g., period corresponding to the window and/or the timer) according to the DL-SkipSig configuration information. Alternatively, the PHY layer of the terminal may suspend the PDCCH monitoring operation until a suspension end time or a restart time according to the DL-SkipSig configuration information. Here, the DL-SkipSig configuration information may be transmitted from the MAC layer to the PHY layer. Alternatively, the DL-SkipSig configuration information may be preconfigured in the PHY layer. When the suspension period of the monitoring operation ends or when the restart time of the PDCCH monitoring operation arrives, the terminal may perform the PDCCH monitoring operation again. The terminal may receive a DCI by performing the PDCCH monitoring operation, and may perform an operation (e.g., downlink reception operation, uplink transmission operation) according to information element(s) included in the DCI.

Figure 6:
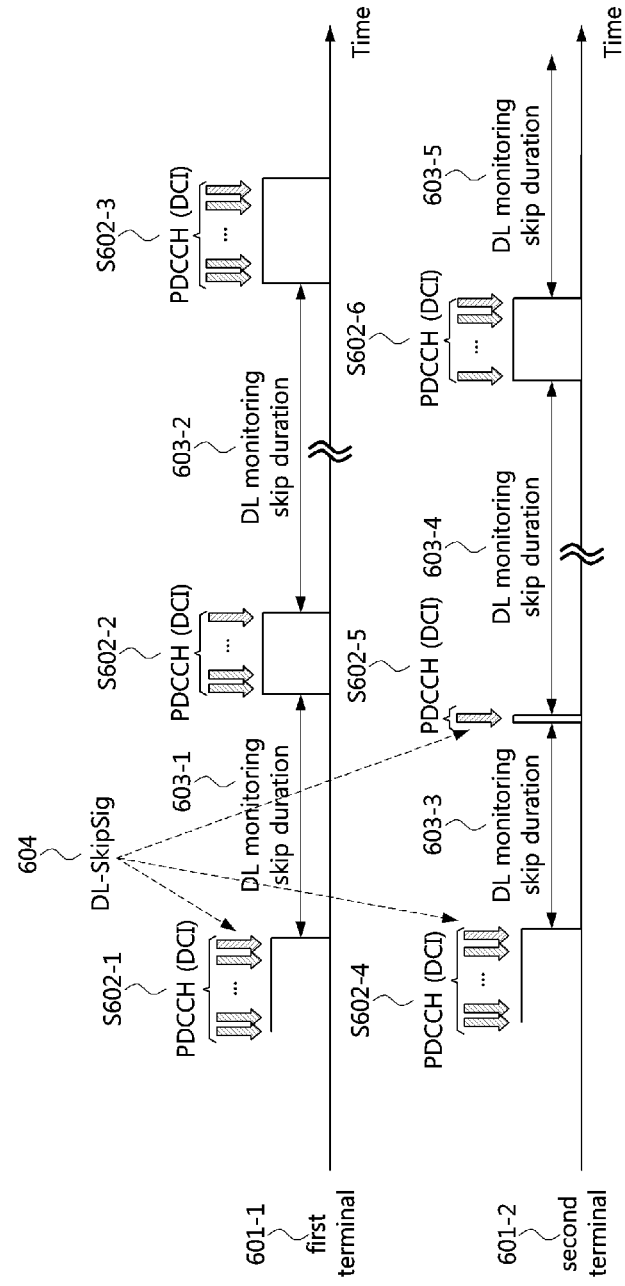
FIG. 6 is a timing diagram illustrating a first exemplary embodiment of a PDCCH monitoring operation based on DL-SkipSig in a communication system.

FIG. 6 is a timing diagram illustrating a first exemplary embodiment of a PDCCH monitoring operation based on DL-SkipSig in a communication system.

As shown in FIG. 6, terminals 601-1 and 601-2 may receive DCI(s) (e.g., PDCCH(s)) including scheduling information and/or control information from a base station (S602-1 to S602-6). When a DL-SkipSig 604 is received, the terminals 601-1 and 601-2 may suspend DL monitoring operations. In exemplary embodiments, the DL monitoring operation may refer to a PDCCH monitoring operation and/or a DCI monitoring operation. The terminals 601-1 and 601-2 may receive the DL-SkipSig 604 in an active DL BWP, a radio resource region configured for the DL-SkipSig signaling operation or a CORESET/search space configured for the DL-SkipSig signaling operation.

The terminal may obtain DL-SkipSig configuration information through system information and/or a separate control message. Each of the system information and the separate control message may include the DL-SkipSig configuration information (e.g., parameter(s) defined in Table 1), DL-MonitSig configuration information (e.g., parameter(s) defined in Table 2), and/or PagingIndSig configuration information (e.g., parameter(s) defined in Table 3). The terminal may suspend the DL monitoring operation during a suspension period (e.g., 603-1 to 603-5; period corresponding to the window and/or the timer) indicated by the DL-SkipSig configuration information or the DL-SkipSig 604. The suspension period may be referred to as 'DL monitoring skip duration'. When the suspension period (e.g., DL monitoring skip duration) ends or when a restart time of the DL monitoring operation arrives, the terminal may perform the DL monitoring operation again (S602-2, S602-3, S602-5, S602-6).

As another method for reducing the power consumption of the terminal by reducing unnecessary PDCCH monitoring operations, signaling (e.g., DL-MonitSig) that controls the PDCCH monitoring operation of the terminal by instructing the terminal (or terminal group) to receive a DCI may be used. The base station may transmit a DL-MonitSig to a terminal (or terminal group). When the DL-MonitSig is received from the base station, the terminal (or terminal group) may perform the PDCCH monitoring operation during a preconfigured period or until a next PDCCH monitoring occasion. When the MonitSig is not received from the base station, the terminal (or terminal group) may not perform the PDCCH monitoring operation during a preconfigured period, until a timer ends, or until a next PDCCH monitoring occasion.

The base station may transmit DL-MonitSig configuration information for controlling the PDCCH monitoring operation of the terminal to the terminal using system information and/or a control message (e.g., RRC message, MAC message, PHY message). The DL-MonitSig configuration information may include one or more parameters defined in Table 2 below.

TABLE 2

DL-MonitSig configuration information

A start time of the PDCCH monitoring operation
An execution period of the PDCCH monitoring operation (e.g., duration of the execution period). The execution period may be configured with a window and/or a timer.
An end time of the PDCCH monitoring operation
DL-MonitSig signaling occasion (or, occasion periodicity)
Offset(s) for parameter(s) for DL-MonitSig signaling
Information of a control resource set (CORESET) and/or a search space in which the DL-MonitSig signaling is transmitted
Information indicating a target (e.g., BWP, terminal, and/or terminal group) of the execution of the PDCCH monitoring operation Each of the parameters defined in Table 2 may be set in units of radio frames, subframes, slots, minislots, or symbols. The execution period of the PDCCH monitoring operation (e.g., period corresponding to a window and/or the timer) may be set as a multiple of the DL-MonitSig signaling occasion (or periodicity). The DL-MonitSig configuration information may be configured for each terminal or each terminal group. When the DL-MonitSig configuration information is configured for each terminal group, a parameter indicating a specific terminal group may be included in the DL-MonitSig configuration information.

A radio resource in which a DL-MonitSig indicating execution of the PDCCH monitoring operation is transmitted may be predefined (or fixed). In this case, the DL-MonitSig configuration information may include configuration parameter(s) for the radio resource in which the DL-MonitSig is transmitted in the time domain and/or the frequency domain. That is, the DI-MonitSig for indicating execution of the PDCCH monitoring operation may be transmitted in the downlink radio resource preconfigured in the time domain and/or the frequency domain. Accordingly, the terminal (or, terminal group) may detect the DL-MonitSig from the preconfigured resource, and may determine whether to perform the PDCCH monitoring according to the detected DL-MonitSig.

The signaling operation of the DL-MonitSig for controlling execution of the PDCCH monitoring operation may be performed using one or a combination of two or more of an RNTI (e.g., scheduling identifier), a DCI (e.g., a control field included in the DCI), a MAC control message (e.g., MAC subheader or MAC (sub)PDU), and an RRC control message.

When the signaling operation of DL-MonitSig is performed based on an RNTI (e.g., scheduling identifier), a scheduling identifier (e.g., MonitSig-RNTI) may be configured for the signaling operation of DL-MonitSig. Here, the scheduling identifier (e.g., MonitSig-RNTI) for the signaling operation of DL-MonitSig may refer to a scheduling identifier uniquely allocated to a specific terminal to support the DL-MonitSig signaling function. One scheduling identifier among the terminal-specific scheduling identifiers may be configured as the MonitSig-RNTI. That is, a terminal-specific RNTI may be configured as the RNTI for the signaling operation of DL-MonitSig. Accordingly, a DCI (e.g., PDCCH) itself having a CRC scrambled by the above-described scheduling identifier (e.g., MonitSig-RNTI) may be used for the signaling operation of DL-MonitSig. The MonitSig-RNTI for the DL-MonitSig signaling operation may be configured as a scheduling identifier commonly applied to one or more terminal groups in the base station. Accordingly, the base station may transmit control information (e.g., DL-MonitSig) indicating whether to perform the PDCCH monitoring operation in units of a terminal or a terminal group by using the MonitSig-RNTI.

When the MonitSig-RNTI is received (e.g., detected), the terminal may perform the PDCCH monitoring operation during a preconfigured execution period (e.g., period corresponding to the window and/or the timer), until an end time of the PDCCH monitoring operation, or until a next PDCCH monitoring occasion according to the DL-MonitSig configuration information. When the execution period of the PDCCH monitoring operation ends or when the next PDCCH monitoring occasion arrives, the terminal may identify whether a DL-MonitSig exists by performing the PDCCH monitoring operation. If a DL-MonitSig for the terminal or terminal group (e.g., terminal group to which the terminal belongs) is not detected, the terminal may not perform the PDCCH monitoring operation until a next PDCCH monitoring occasion.

Alternatively, the signaling operation of DL-MonitSig may be performed based on a DCI. A control field (e.g., information element, control information) in the DCI may indicate whether to perform the PDCCH monitoring operation.

The DL-MonitSig configuration information may be preconfigured using system information and/or a control message. In this case, according to the DL-MonitSig configuration information, the terminal may perform the PDCCH monitoring operation during an execution period (e.g., period corresponding to the window and/or the timer), until an end time of the PDCCH monitoring operation, or until a next PDCCH monitoring occasion. When the execution period of the PDCCH monitoring operation ends or when the next PDCCH monitoring occasion arrives, the terminal may identify whether a DL-MonitSig exists by performing the PDCCH monitoring operation.

Alternatively, the execution of the PDCCH monitoring operation may be indicated based on a DCI. In this case, the DCI may include one or more parameters defined in Table 2 above. Each parameter (e.g., configuration information) may be set in units of radio frames, subframes, slots, minislots, or symbols. The execution period of the PDCCH monitoring operation (e.g., period corresponding to the window and/or the timer) may be set as a multiple of the DL-MonitSig signaling occasion (or periodicity).

The terminal may receive the DCI from the base station, and may determine whether to perform the PDCCH monitoring operation according to DL-MonitSig information included in the DCI. For example, the terminal may start a PDCCH monitoring operation at a start time according to the DL-MonitSig information included in the DCI. The terminal may perform the PDCCH monitoring operation during an execution period (e.g., period corresponding to the window and/or the timer), until an end time of the PDCCH monitoring operation, or until a next PDCCH monitoring occasion by using a preconfigured parameter or a parameter (e.g., DL-MonitSig parameter) in the DCI. When the execution period of the PDCCH monitoring operation ends or when the next PDCCH monitoring occasion arrives, the terminal may identify whether a DL-MonitSig exists.

When the DL-MonitSig signaling operation is performed based on a DCI, a specific bit in the DCI may be used to control the PDCCH monitoring operation. For example, a specific bit set to a first value (e.g., 1) may indicate execution of the PDCCH monitoring operation, and a specific bit set to a second value (e.g., 0) may indication suspension of the PDCCH monitoring operation. In addition, the specific bit set to the second value may indicate that data (e.g., packet) to be transmitted to the terminal (or terminal group) through a PDSCH radio resource does not exist in a corresponding scheduling period. Therefore, when the specific bit in the DCI is set to the second value, the terminal (or terminal group) may not perform a reception operation (e.g., demodulation operation, decoding operation) in a PDSCH radio resource in the corresponding scheduling period.

When execution of the PDCCH monitoring operation is indicated using the control information in the DCI, the DCI may further include information indicating a specific terminal group. All terminals belonging to the terminal group indicated by the DCI may determine whether to perform the PDCCH monitoring operation based on the DCI, and may perform the operation according to the determination result.

The base station may transmit a DCI indication execution of the PDCCH monitoring operation to the terminal using the above-described MonitSig-RNTI. In this case, the terminal (or terminal group) may determine whether to perform the PDCCH monitoring operation using the MonitSig-RNTI and/or the control information included in the DCI.

Alternatively, the DL-MonitSig signaling operation may be performed based on a MAC control message (e.g., MAC subheader or MAC (sub)PDU). The base station may indicate to the terminal whether to perform the PDCCH monitoring operation by using the MAC control message. When the MAC control message indicates execution of the PDCCH monitoring operation, the MAC layer of the terminal may transmit an internal signal (e.g., primitive or triggering signal) indicating execution of the PDCCH monitoring operation to the PHY layer of the terminal. When the internal signal indicating execution of the PDCCH monitoring operation is received from the MAC layer, the PHY layer of the terminal may perform the PDCCH monitoring operation during an execution period (e.g., period corresponding to the window and/or the timer) of the PDCCH monitoring operation, until an end time of the PDCCH monitoring operation, or until a next PDCCH monitoring occasion according to the DL-MonitSig configuration information. Here, the DL-MonitSig configuration information may be preconfigured in the PHY layer. Alternatively, the DL-MonitSig configuration information may be transmitted from the MAC layer to the PHY layer. When the execution period of the PDCCH monitoring operation ends or when the next PDCCH monitoring occasion arrives, the terminal may identify whether a DL-MonitSig signaling exists by receiving a DCI.

Figure 7:
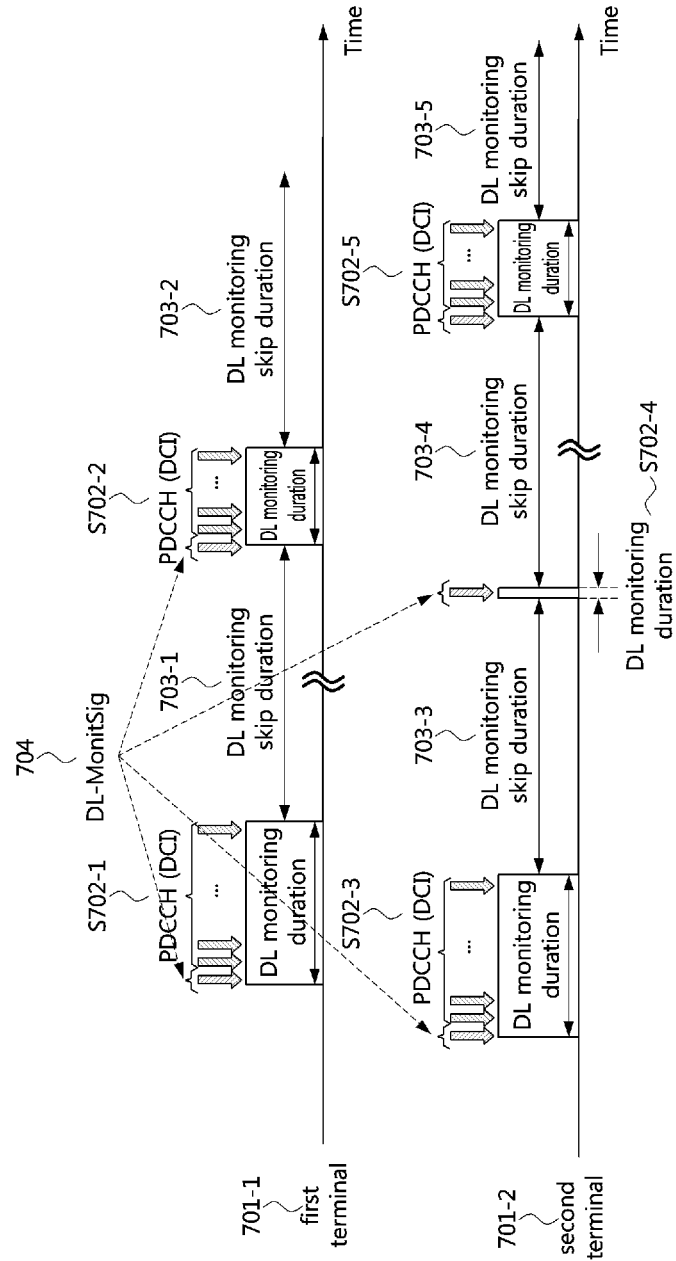
FIG. 7 is a timing diagram illustrating a first exemplary embodiment of a PDCCH monitoring operation based on DL-MonitSig in a communication system.

FIG. 7 is a timing diagram illustrating a first exemplary embodiment of a PDCCH monitoring operation based on DL-MonitSig in a communication system.

As shown in FIG. 7, terminals 701-1 and 701-2 may receive a DL-MonitSig 704 indicating execution of the DL monitoring operation from a base station, and receive DCI(s) (e.g., PDCCH(s)) including scheduling information and/or control information from the base station (S702-1 to S702-5). The terminals may receive the DL-MonitSig 704 from the base station in an active DL BWP, a radio resource region configured for the DL-MonitSig signaling operation, and/or a CORESET/search space configured for the DL-MonitSig signaling operation.

When the DL-MonitSig 704 is received, the terminal may perform the PDCCH monitoring operation (e.g., DL monitoring operation) in an execution period of the PDCCH monitoring operation (e.g., DL monitoring duration in FIG. 7) indicated by DL-MonitSig configuration information configured by system information and/or a separate control message or the DL-MonitSig. Each of the system information and the separate control message may include the DL-SkipSig configuration information (e.g., parameter(s) defined in Table 1), the DL-MonitSig configuration information (e.g., parameter(s) defined in Table 2), and/or PagingIndSig configuration information (e.g., parameter(s) defined in Table 3). When the DL monitoring duration ends or when an end time of the DL monitoring operation arrives, the terminal may suspend the downlink monitoring operation until a next DL-MonitSig signaling occasion (or, reception period, reception time) (703-1 to 703-5). The period in which the downlink monitoring operation is suspended may be a DL monitoring skip duration.

The signaling information of DL-SkipSig or DL-MonitSig that controls execution of the PDCCH monitoring operation may be transmitted in a specific radio resource (e.g., specific resource region) for PDCCH transmission. Here, 'signaling information is transmitted in a specific resource region' may mean 'a radio resource for PDCCH transmission is configured in the frequency domain and/or time domain', 'a search space and/or CORESET in which the PDCCH is transmitted is configured', and/or 'signaling information of DL-SkipSig or DL-MonitSig (e.g., DCI including the signaling information of DL-SkipSig or DL-MonitSig is first transmitted and detected in a step of receiving (e.g., demodulating and decoding) a DCI'. For example, in order to configure a search space in which the PDCCH is transmitted, an index of the search space in which the DL-SkipSig or DL-MonitSig is transmitted may be allocated. The index of the search space in which the DL-SkipSig or DL-MonitSig is transmitted may be included in the DL-SkipSig configuration information or the DL-MonitSig configuration information.

As a method for allowing the DCI including the signaling information DL-SkipSig or DL-MonitSig to be detected first, an aggregation level of control channel elements (CCEs) constituting the DCI may be set to the lowest (e.g., level=1). Alternatively, the signaling information of DL-SkipSig or DL-MonitSig may include information of the aggregation level of the corresponding DCI. In this case, in the step of receiving the DCI, the terminal may preferentially identify the signaling information of DL-SkipSig or DL-MonitSig.

Meanwhile, the terminal may receive the DL-SkipSig (604 shown in FIG. 6) or the DL-MonitSig (704 shown in FIG. 7) from the base station. In this case, the terminal may apply an offset from a reception time of the DL-SkipSig 604 or the DL-MonitSig 704 to an execution time of the operation according to the DL-SkipSig 604 or the DL-MonitSig 704. For example, the terminal may suspend execution of the DL monitoring operation (e.g., PDCCH monitoring operation) after the offset from the reception time of the DL-SkipSig 604. In addition, the terminal may perform the DL monitoring operation after the offset from the reception time of the DL-MonitSig 704.

Each of the DL-SkipSig and DL-MonitSig controlling the PDCCH monitoring operation may be indicated as 'DL-Sig'. That is, the DL-Sig may mean DL-SkipSig and/or DL-MonitSig. A specific field (e.g., specific bit(s)) included in the DCI may be set to the DL-Sig. Information indicating an application time of a DL-Sig signaling operation may be configured by a field (e.g., bit(s), parameter(s)) in the DCI, a MAC subheader, a MAC CE, or system information.

The monitoring operation for a downlink channel (e.g., PDCCH) may be performed according to the DL-Sig. During the execution of the monitoring operation, an operation according to an inactivity timer may be selectively performed as follows.

Option 1: The inactivity timer may be operated according to the conventional operation. That is, the inactivity timer may be reset and (re)started regardless of the DL-Sig.

Option 2: If an operation timer according to the DL-Sig expires after the inactivity timer is stopped, the inactivity timer may be reset and (re)started.

Option 3: If an operation timer according to the DL-Sig expires after the inactivity timer is stopped, the inactivity timer may be (re)started without being reset.

In the period in which the monitoring operation for a downlink channel is not performed according to the DL-Sig, the existing configuration according to a semi-persistent scheduling (SPS) or a configured grant (CG) is maintained, and thus an uplink transmission operation according to the SPS or CG (e.g., PUSCH transmission operation, PUCCH transmission operation, scheduling request (SR) transmission operation) may be performed.

When a carrier aggregation (CA) function is applied, DL-Sig signaling information that controls execution of the PDCCH monitoring operation may be transmitted in a primary cell (or, SpCell of the 3GPP NR system). A method of indicating whether to perform the PDCCH monitoring operation based on a cross carrier scheduling scheme may be excluded.

When the method of indicating whether to perform the PDCCH monitoring operation based on a cross-carrier scheduling scheme is allowed, an identifier (e.g., cell identifier, BWP identifier) for identifying a target (e.g., cell, BWP) of the DL-Sig signaling for controlling the PDCCH monitoring operation or information indicating the corresponding target may be included in cross-carrier scheduling information transmitted to the terminal (or terminal group).

[Method of Controlling a PDCCH Monitoring Operation for Paging Message Reception]

The base station may transmit paging information (e.g., paging message) according to a discontinuous reception (DRX) cycle of the terminal in order to notify reception of downlink data or a change of system information. The terminal may perform a DRX operation to reduce power consumption. In this case, the terminal may perform a monitoring operation for a downlink channel in a specific period according to a DRX cycle.

The terminal may identify a paging occasion (PO) of a paging frame (PF) based on the DRX cycle, a terminal identifier (e.g., UE ID), and/or a system frame number (SFN). The terminal may receive a DCI (e.g., paging DCI) masked with a scheduling identifier (e.g., P-RNTI) for transmission of paging information in the paging occasion of the paging frame, thereby identifying whether paging information exists or not or whether system information is changed or not. The PF and/or PO for transmission of the paging DCI may be configured differently for each terminal. The paging DCI may selectively include Short Message information indicating whether the system information is changed. The paging DCI may include a Short Messages Indicator indicating presence of the Short Message information and/or presence of paging scheduling information. The size of the Short Message Indicator may be 1 bit or 2 bits.

As an additional method for reducing power consumption of the terminal, a method of controlling the PDCCH monitoring operation for receiving paging information may be proposed. For example, based on the signaling concept of DL-SkipSig or DL-MonitSig described above, the terminal may be controlled to determine whether to receive paging information at a specific time (e.g., PF and/or PO). The terminal may perform an operation of receiving paging information (e.g., paging message) in a PO according to the DRX cycle. For example, the terminal may receive a PagingIndSig (or, paging wake up signaling (P-WUS)) at a preconfigured time based on the PF and/or PO or in the PF and/or PO of the corresponding terminal. When the terminal receives the PagingIndSig (or P-WUS), the terminal may perform an operation of receiving paging information.

The base station may control whether to perform the PDCCH monitoring operation for reception of paging information by using the PagingIndSig. To support the signaling operation of PagingIndSig, or for signaling of PagingIndSig, the base station may deliver one or more parameters defined in Table 3 below to the terminal. One or more parameters defined in Table 3 may be transmitted using one or a combination of two or more of system information, an RRC control message, a MAC control message, and a PHY control message (e.g., PDCCH, DCI).

TABLE 3

PagingIndSig configuration information

A signaling time of PagingIndSig
An offset between the signaling time of PagingIndSig and a PF and/or PO
An execution period of the PDCCH monitoring operation according to PagingIndSig signaling (e.g., duration of the execution period). The execution period may be configured with a window and/or a timer.
A start time of the PDCCH monitoring operation according to PagingIndSig signaling
An end time of the PDCCH monitoring operation according to PagingIndSig signaling
PagingIndSig signaling occasion (or, occasion periodicity)
A start offset of the PDCCH monitoring operation according to PagingIndSig signaling TABLE 3-continued PagingIndSig configuration information Information of a CORESET and/or a search space in which the PagingIndSig signaling is transmitted
Information indicating a target (e.g., BWP, terminal, and/or terminal group) of the execution of the PDCCH monitoring operation for paging information reception The offset (hereinafter referred to as 'PagingIndSig signaling offset' or 'P-WUS offset') between the PagingIndSig signaling time and the PF and/or PO may refer to a time domain offset (or difference) between the PF and/or PO configured for each terminal or terminal group and the signaling time of the PagingIndSig. The PagingIndSig may be transmitted to the terminal before the PagingIndSig signaling offset (or P-WUS offset) from the PF and/or PO configured for each terminal or terminal group.

Each of the parameters defined in Table 3 may be set in units of radio frames, subframes, slots, minislots, or symbols. The execution period (or, window, period corresponding to the window, or duration) of the PDCCH monitoring operation according to the PagingIndSig signaling may be set as a multiple of a PagingIndSig signaling occasion periodicity, the DRX cycle, or a PO periodicity of the terminal.

The execution period (e.g., window, period corresponding to the timer, duration) of the PDCCH monitoring operation according to the PagingIndSig signaling may be configured based on a timer indicating the execution time of the PDCCH monitoring operation, the number of POs to be monitored, the start time of the PDCCH monitoring operation according to the PagingIndSig signaling and/or the end time of the PDCCH monitoring operation according to the PagingIndSig signaling.

Figure 8:
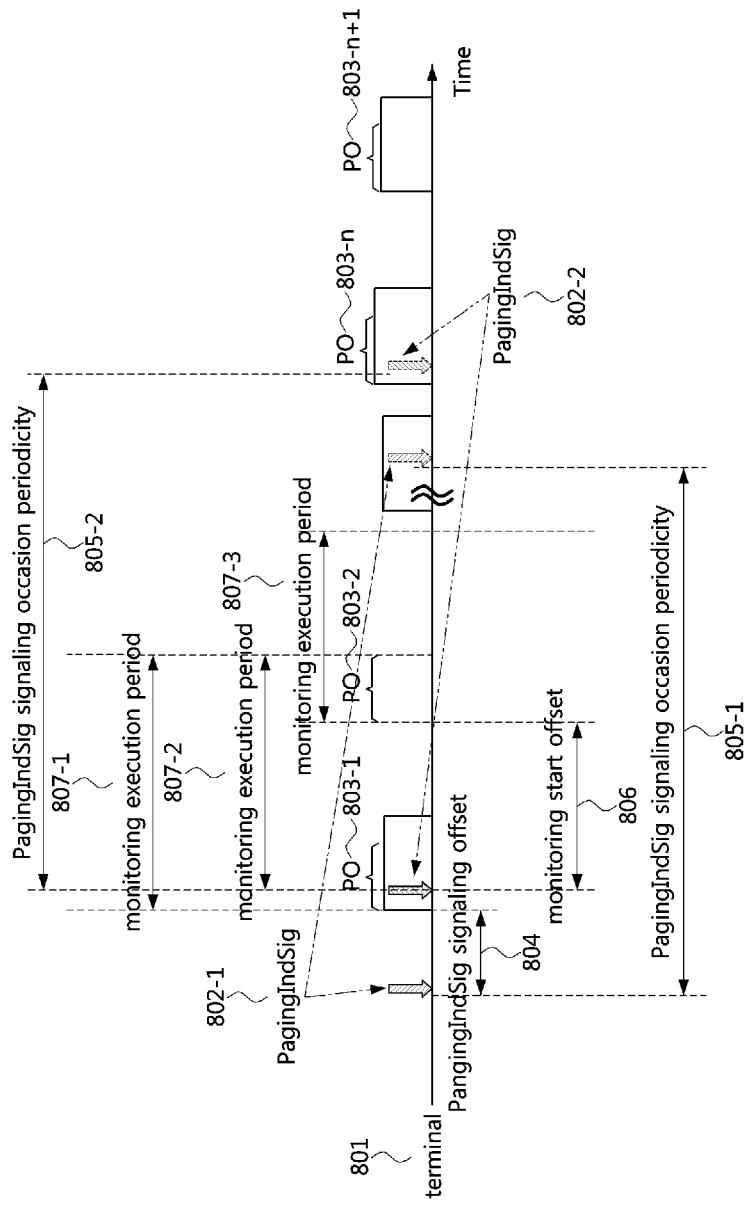
FIG. 8 is a timing diagram illustrating a first exemplary embodiment of a PagingIndSig signaling method in a communication system.

FIG. 8 is a timing diagram illustrating a first exemplary embodiment of a PagingIndSig signaling method in a communication system.

As shown in FIG. 8, a method 1 and/or a method 2 may be used for the PagingIndSig signaling. In exemplary embodiments, a PO may mean a PF, and a PagingIndSig signaling offset may mean a P-WUS offset.

Method 1: PagingIndSig 802-1 may be transmitted before a PagingIndSig signaling offset 804 from a reference time of a PO 803-1 for a terminal or terminal group.
Method 2: PagingIndSig 802-1 may be transmitted in the PO 803-1 for the terminal or terminal group.

The base station may control the PDCCH monitoring operation for reception of paging information (e.g., paging message) according to the method 1 or method 2. The terminal 801 may receive PagingIndSig 802-1 and 802-2 from the base station according to the method 1 or method 2. When the PagingIndSig 802-1 and 802-2 are received, the terminal may perform a paging information reception operation in the PDCCH monitoring operation periods 807-1, 807-2, and/or 807-3.

The execution period 807-1 of the first PDCCH monitoring operation may be an execution period of the monitoring operation according to the PagingIndSig 802-1 when the method 1 is used. The execution period 807-2 of the second PDCCH monitoring operation may be an execution period of the monitoring operation according to the PagingIndSig 802-2 when the method 2 is used. The execution period 807-3 of the third PDCCH monitoring operation may be an execution period of the monitoring operation according to the PagingIndSig 802-2 when a monitoring start offset 806 is applied in the method 2.

The base station may configure the monitoring start offset 806 indicating the start time of the PDCCH monitoring operation, and may inform the terminal 801 of the monitoring start offset 806. The monitoring start offset 806 may be applied from the reception time of the PagingIndSig 802-1 and 802-2. The above-described operation may be applied to the method 1 and/or the method 2. In this case, the terminal 801 may perform the PDCCH monitoring operation after the monitoring start offset 806 from the reception time of the PagingIndSig 802-1.

On the other hand, the terminal may not be able to receive the PagingIndSig. In this case, the terminal may not perform the PDCCH monitoring operation for reception of paging information in the PO within the PDCCH monitoring operation execution period and/or the PDCCH monitoring operation for reception of paging information until a next PagingIndSig signaling occasion according to a PagingIndSig signaling occasion periodicity 805-1 and 805-2.

The signaling operation of PagingIndSig may be performed using a separate DCI format and/or the existing DCI format. When the existing DCI format is used for PagingIndSig signaling, 'Short Message', 'Short Messages Indicator', and/or 'reserved' bits included in the existing DCI format may be used for the PagingIndSig signaling.

The terminal may perform the PDCCH monitoring operation for receiving PagingIndSig and/or paging information according to the DRX cycle. Alternatively, the terminal may be controlled to perform the PDCCH monitoring operation according to a periodicity longer than the DRX cycle or a periodicity shorter than the DRX cycle.

In order to control the PDCCH monitoring operation for reception of paging information, control information included in the DCI may be used. To support this operation, the Short Messages Indicator included in the DCI may be used. Also, to support this operation, the DCI may include the PagingIndSig.

When using the Short Message Indicator to control the PDCCH monitoring operation (e.g., DCI monitoring operation) for reception of paging information, the Short Messages Indicator set to a specific pattern (e.g., specific value) may indicate execution of the PDCCH monitoring operation for reception of paging information. For example, when the Short Message Indicator has a length of 2 bits, the specific pattern may be '00'. When the PagingIndSig indicates execution of the PDCCH monitoring operation, and the Short Message Indicator in the DCI is set to '00', the terminal may perform the PDCCH monitoring operation for reception of paging information during an execution period (e.g., period corresponding to the window and/or the timer) or until a next PagingIndSig signaling occasion according to a PagingIndSig signaling occasion periodicity. When the PagingIndSig indicates suspension of the PDCCH monitoring operation, and the Short Message Indicator in the DCI is set to '00', the terminal may not perform the PDCCH monitoring operation for reception of paging information during the execution period (e.g., period corresponding to the window and/or the timer) or until a next PagingIndSig signaling occasion according to the PagingIndSig signaling occasion periodicity.

Alternatively, the base station may transmit a paging DCI including the PagingIndSig. In this case, reserved bits in the paging DCI may be used to indicate the PagingIndSig. Alternatively, the PagingIndSig may be expressed as a logical operation (e.g., exclusive OR (XOR)) with short message information included in the paging DCI. For example, when the PagingIndSig (or PagingIndSig in the DCI) indicates execution of the PDCCH monitoring operation, the terminal may perform the PDCCH monitoring operation for reception of paging information during an execution period (e.g., period corresponding to the window and/or the timer) or until a next PagingIndSig signaling occasion.

When the PagingIndSig (or PagingIndSig in the DCI) indicates suspension (or stop or skip) of the PDCCH monitoring operation or when the PagingIndSig is not received, the terminal may not perform the PDCCH monitoring operation for reception of paging information during the execution period (e.g., period corresponding to the window and/or the timer) or until a next PagingIndSig signaling occasion.

When the PagingIndSig signaling operation is performed according to the above-described method, the DCI including the PagingIndSig may further include the following information element(s).

Information indicating the execution period of the PDCCH monitoring operation

Information indicating a terminal group for the PagingIndSig signaling

The information indicating the execution period of the PDCCH monitoring operation may be information of a time period in which the PDCCH monitoring operation is performed in order to receive the paging information. The information indicating the execution period of the PDCCH monitoring operation may include a time window, a timer, the number of POs, the start time of the PDCCH monitoring operation according to the PagingIndSig signaling, and/or the end time of the PDCCH monitoring operation according to the PagingIndSig signaling.

The terminal receiving the PagingIndSig signaling may identify the execution period of the PDCCH monitoring operation for reception of paging information, based on the time window, the timer, the number of POs, the start time of the PDCCH monitoring operation according to the PagingIndSig signaling, and/or the end time of the PDCCH monitoring operation according to the PagingIndSig signaling.

When the PagingIndSig signaling is not received or when a paging message is not received in a PO within the execution period of the PDCCH monitoring operation according to the PagingIndSig signaling, the terminal may not perform the PDCCH monitoring operation for reception of paging information until a next PagingIndSig signaling occasion.

The information indicating the terminal group for the PagingIndSig signaling may be an identifier or indicator indicating the terminal group to which the corresponding PagingIndSig signaling is applied. The information indicating the terminal group for the PagingIndSig signaling may be configured in form of a bitmap. In this case, each bit included in the bitmap may correspond to one or more terminal groups. Information indicating the correspondence between each bit and a terminal group(s) may be delivered to the terminal through system information and/or a control message. For example, a terminal group corresponding to a bit set to a first value (e.g., 0 or 1) in the bitmap may perform the operation of receiving paging information according to the above-described method. A terminal belonging to the terminal group corresponding to the bit set to the first value may be a terminal receiving the PagingIndSig. A terminal group corresponding to the bit set to a second value (e.g., 1 or 0) in the bitmap may not perform the PDCCH monitoring operation. The bitmap may indicate the PagingIndSig signaling to one or more terminal groups.

A scheduling identifier (e.g., PagingInd-RNTI) for the PagingIndSig transmission may be configured. The PagingInd-RNTI (i.e., P-RNTI) may be configured for a terminal or a terminal group. Alternatively, one or more P-RNTIs may be configured for a terminal group. The base station may transmit the PagingIndSig to a terminal or terminal group using the PagingInd-RNTI or P-RNTI. The terminal or the terminal group may receive the PagingIndSig from the base station, and may determine whether to perform the PDCCH monitoring operation for reception of paging information based on the PagingIndSig.

The PagingIndSig information (e.g., PagingIndSig) included in the paging DCI may indicate whether to perform the PDCCH monitoring operation for reception of paging information. In this case, the terminal may perform or suspend (or skip) the PDCCH monitoring operation for reception of paging information according to the PagingIndSig included in the paging DCI.

PagingIndSig configuration information (e.g., some parameters included in the configuration information) may be configured for a base station (or cell), a radio access network (RAN)-based notification area (RNA), or a system information (SI) area (e.g., area identified by systemInformationAreaID). When the base station (or cell), RNA, or SI area is changed, the terminal may update the PagingIndSig configuration information by performing a system information update procedure or an SI area update procedure. When the base station (or cell), RNA, or SI area changes according to the movement of the terminal, the terminal may determine whether or not the PagingIndSig configuration information (e.g., some parameters included in the configuration information) is changed or valid. For example, the terminal may determine whether each of the time point of the PagingIndSig signaling, the time point of the PDCCH monitoring operation by the PagingIndSig signaling, the PagingIndSig signaling offset (or P-WUS offset), and the execution period of the PDCCH monitoring operation by the PagingIndSig signaling is changed or not, or determine whether each of them is valid or not. When a specific parameter is changed or when a specific parameter is invalid, the terminal may perform a procedure of updating the specific parameter (e.g., procedure of changing or resetting the specific parameter).

A radio resource for the PagingIndSig signaling may be preconfigured. A BWP, CORESET, and/or search space in which the PagingIndSig is transmitted may be preconfigured. For example, the BWP in which the PagingIndSig is transmitted may be limited to an initial BWP or a preconfigured BWP. The CORESET in which the PagingIndSig is transmitted may be limited to a CORESET #0 or a CORESET #1. The search space in which the PagingIndSig is transmitted may be limited to a common search space, a terminal-specific (i.e., UE-specific) search space, a specific resource within a common search space, and/or a specific resource within a terminal-specific search space.

The terminal may not receive the PagingIndSig signaling at the time point of receiving the PagingIndSig signaling according to the method 1 (e.g., the time point before the PagingIndSig signaling offset (or P-WUS offset) from the reference point of the PF/PO for the terminal or terminal group) or at the time point of receiving the PagingIndSig signaling according to the method 1. In this case, the terminal may not perform the PDCCH monitoring operation for reception of paging information in the PO within the execution period of the PDCCH monitoring operation and/or the PDCCH monitoring operation for reception of paging information until a next PagingIndSig signaling occasion.

When the PagingIndSig signaling is not received, the terminal may not be able to perform the PDCCH monitoring operation. The system information may be changed according to a system information modification periodicity in the period in which the terminal does not perform the PDCCH monitoring operation. The terminal may identify whether the system information is changed (or valid). When the system information is changed or when the system information stored in the terminal is invalid, the terminal may perform a system information acquisition procedure.

That is, in the period in which the terminal not receiving the PagingIndSig signaling does not perform the PDCCH monitoring operation, when a boundary of the system information change period is located or when a new system information change period starts, the terminal may identify whether the system information is changed (or valid) regardless of whether the information notifying the change of the system information is received. When the system information is changed or when the system information stored in the terminal is invalid, the terminal may perform a system information acquisition procedure.

The PagingIndSig configuration information may be configured in order to prevent the above-described system information update procedure (e.g., the procedure for identify whether system information is changed (or valid), the procedure system information acquisition procedure). The PO for receiving the information notifying the change of the system information may be guaranteed. For example, the execution period of the PDCCH monitoring operation may be configured to include the PO in which the information notifying the change of the system information is transmitted and received. The parameter(s) for the PagingIndSig signaling occasion periodicity and/or the execution period of the PDCCH monitoring operation may be configured such that the PO in which the information notifying the change of the system information is transmitted and received and the execution period of the PDCCH monitoring operation are aligned with each other.

In the present disclosure, the radio channel quality may be a channel state indicator (CSI), a received signal strength indicator (RSSI), a reference signal received power (RSRP), a reference signal received quality (RSRQ), or a signal to interference and noise ratio (SINR). With respect to the operation of the timer defined or described in the present disclosure, although operations such as start, stop, reset, restart, or expire of the defined timer are not separately described, they mean or include the operations of the corresponding timer or a counter for the corresponding timer.

In the present disclosure, the base station (or cell) may refer to a node B (NodeB), an evolved NodeB, a base transceiver station (BTS), a radio base station, a radio transceiver, an access point, an access node, a road side unit (RSU), a radio remote head (RRH), a transmission point (TP), a transmission and reception point (TRP), or a gNB. In addition, the base station (or, cell) may a CU node or a DU node to which the functional split is applied.

In the present disclosure, the terminal may refer to a UE, a terminal, an access terminal, a mobile terminal, a station, a subscriber station, a mobile station, a portable subscriber station, a node, a device), an Internet of Thing (IoT) device, or a mounted apparatus (e.g., a mounted module/device/terminal or an on-board device/terminal).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, the method comprising:
receiving system information including first configuration information for a paging operation from a base station;
receiving first downlink control information (DCI) including second configuration information indicating a paging occasion and a terminal group, the paging occasion being one paging occasion of one or more paging occasions configured by the first configuration information from the base station, and the terminal group being one terminal group of one or more terminal groups configured by the first configuration information; and
performing, in the paging occasion indicated by the second configuration information, a physical downlink control channel (PDCCH) monitoring operation to receive a paging message.

2. The method according to claim 1, wherein the first configuration information includes at least one of an information element indicating a number of the one of more paging occasions, an information element indicating an offset of a paging frame associated with the one or more paging occasions, an information element indicating the one or more terminal groups to perform the paging operation, an information element used to indicate a signaling time of the first DCI, or an information element of a search space for the first DCI.

3. The method according to claim 1, wherein the second configuration information is a bitmap and each bit included in the bitmap indicates one terminal group.

4. The method according to claim 1, wherein, when the terminal belongs to the terminal group indicated by the second configuration information, the terminal performs the PDCCH monitoring operation.

5. The method according to claim 1, wherein, when the terminal does not belong to the terminal group indicated by the second configuration information, the PDCCH monitoring operation is not performed in the terminal.

6. The method according to claim 1, wherein, when the terminal does not receive the first DCI, the PDCCH monitoring operation is not performed in the terminal.

7. The method according to claim 1, wherein the first DCI is received using a radio network temporary identifier (RNTI) for the paging operation.

8. A method of a base station, the method comprising:
transmitting system information including first configuration information for a paging operation in a terminal;
transmitting first downlink control information (DCI) including second configuration information indicating a paging occasion and a terminal group, the paging occasion being one paging occasion of one or more paging occasions configured by the first configuration information, and the terminal group being one terminal group of one or more terminal groups configured by the first configuration information; and
transmitting, in the paging occasion indicated by the second configuration information, second DCI including a paging message.

9. The method according to claim 8, wherein the first configuration information includes at least one of an information element indicating a number of the one of more paging occasions, an information element indicating an offset of a paging frame associated with the one or more paging occasions, an information element indicating the one or more terminal groups to perform the paging operation, an information element used to indicate a signaling time of the first DCI, or an information element of a search space for the first DCI.

10. The method according to claim 8, wherein the second configuration information is a bitmap and each bit included in the bitmap indicates one terminal group.

11. The method according to claim 8, wherein the first DCI is transmitted using a radio network temporary identifier (RNTI) for the paging operation.

12. A terminal, comprising:
a processor,
wherein the processor causes the terminal to:
receive system information including first configuration information for a paging operation from a base station;
receive first downlink control information (DCI) including second configuration information indicating a paging occasion and a terminal group, the paging occasion being one paging occasion of one or more paging occasions configured by the first configuration information from the base station, and the terminal group being one terminal group of one or more terminal groups configured by the first configuration information; and
perform, in the paging occasion indicated by the second configuration information, a physical downlink control channel (PDCCH) monitoring operation to receive a paging message.

13. The terminal according to claim 12, wherein the first configuration information includes at least one of an information element indicating a number of the one of more paging occasions, an information element indicating an offset of a paging frame associated with the one or more paging occasions, an information element indicating the one or more terminal groups to perform the paging operation, an information element used to indicate a signaling time of the first DCI, or an information element of a search space for the first DCI.

14. The terminal according to claim 12, wherein the second configuration information is a bitmap and each bit included in the bitmap indicates one terminal group.

15. The terminal according to claim 12, wherein, when the terminal belongs to the terminal group indicated by the second configuration information, the terminal performs the PDCCH monitoring operation.

16. The terminal according to claim 12, wherein, when the terminal does not belong to the terminal group indicated by the second configuration information or the terminal does not receive the first DCI, the PDCCH monitoring operation is not performed in the terminal.

17. The terminal according to claim 12, wherein the first DCI is received using a radio network temporary identifier (RNTI) for the paging operation.

\* \* \* \* \*